United States Patent
Tanaka et al.

(10) Patent No.: US 8,083,518 B2
(45) Date of Patent: *Dec. 27, 2011

(54) COMBUSTION METHOD AND COMBUSTION APPARATUS

(75) Inventors: Osamu Tanaka, Matsuyama (JP);
Yukihiro Tokunaga, Matsuyama (JP);
Yusuke Okamoto, Matsuyama (JP);
Kenji Yasui, Matsuyama (JP)

(73) Assignee: Miura Co., Ltd., Matsuyama-shi (JP)

( * ) Notice: Subject to any disclaimer, the term of this patent is extended or adjusted under 35 U.S.C. 154(b) by 644 days.

This patent is subject to a terminal disclaimer.

(21) Appl. No.: 12/162,383

(22) PCT Filed: Feb. 18, 2008

(86) PCT No.: PCT/JP2008/052659
§ 371 (c)(1),
(2), (4) Date: Jul. 28, 2008

(87) PCT Pub. No.: WO2008/129893
PCT Pub. Date: Oct. 30, 2008

(65) Prior Publication Data
US 2010/0227283 A1    Sep. 9, 2010

(30) Foreign Application Priority Data
Apr. 16, 2007 (JP) .................... 2007-107298

(51) Int. Cl.
*F23N 1/02* (2006.01)
*F23N 5/00* (2006.01)
*F01N 3/00* (2006.01)
*F01N 3/10* (2006.01)
*B01D 53/56* (2006.01)

(52) U.S. Cl. ............... 431/12; 431/89; 431/76; 60/274; 60/299; 423/239.1

(58) Field of Classification Search ............. 431/2, 12, 431/89, 90, 76, 10; 60/274, 299; 122/7 R; 423/239.1

See application file for complete search history.

(56) References Cited

U.S. PATENT DOCUMENTS
5,353,748 A    10/1994    Kayahara et al.
(Continued)

FOREIGN PATENT DOCUMENTS
EP    0 208 434 A1    1/1987
(Continued)

OTHER PUBLICATIONS
International Search Report of PCT/JP2008/052659, date of mailing May 20, 2008.

*Primary Examiner* — Kenneth Rinehart
*Assistant Examiner* — William Corboy
(74) *Attorney, Agent, or Firm* — Westerman, Hattori, Daniels & Adrian, LLP

(57) ABSTRACT

A combustion method applied to a water-tube boiler and a regenerator of an absorption-type refrigerator includes a concentration ratio adjusting step of adjusting a concentration ratio of nitrogen oxides, carbon monoxide, and oxygen in a gas from a gas generation source to a predetermined reference concentration ratio, and a hazardous-substance decreasing step of decreasing nitrogen oxides, using an oxidation catalyst having characteristics of decreasing the concentrations of nitrogen oxides and carbon monoxide on a secondary side to substantially zero when the concentration ratio on a primary side is set to be a reference concentration ratio, in which the concentration ratio adjusting step detects the concentration of oxygen on the secondary side of the oxidation catalyst to control the concentration ratio so that a detected oxygen concentration becomes a set oxygen concentration substantially close to zero. According to the combustion method, the emission amount of nitrogen oxides can be decreased to close to zero as much as possible, and the emission amount of carbon monoxide can be decreased to a permissible range. Further, the control of a concentration ratio can be performed stably by detecting the concentration of oxygen.

4 Claims, 15 Drawing Sheets

U.S. PATENT DOCUMENTS

| | | | |
|---|---|---|---|
| 6,425,754 B1 * | 7/2002 | Lindskog | 431/5 |
| 6,792,895 B2 | 9/2004 | Kayahara et al. | |
| 2004/0120872 A1 * | 6/2004 | Fan et al. | 423/239.1 |
| 2009/0042152 A1 * | 2/2009 | Tanaka et al. | 431/12 |

FOREIGN PATENT DOCUMENTS

| | | |
|---|---|---|
| JP | 61-291026 A | 12/1986 |
| JP | 5-38421 A | 2/1993 |
| JP | 06-94203 A | 4/1994 |
| JP | 6-65708 U | 9/1994 |
| JP | 06-065708 U | 9/1994 |
| JP | 7-133905 A | 5/1995 |
| JP | 2001-241619 A | 9/2001 |
| JP | 2003-275543 A | 9/2003 |
| JP | 2004-069139 A | 3/2004 |
| JP | 2004-077085 A | 3/2004 |
| JP | 2004-125378 A | 4/2004 |
| WO | 99-20375 A1 | 4/1999 |

* cited by examiner

[Fig.1]
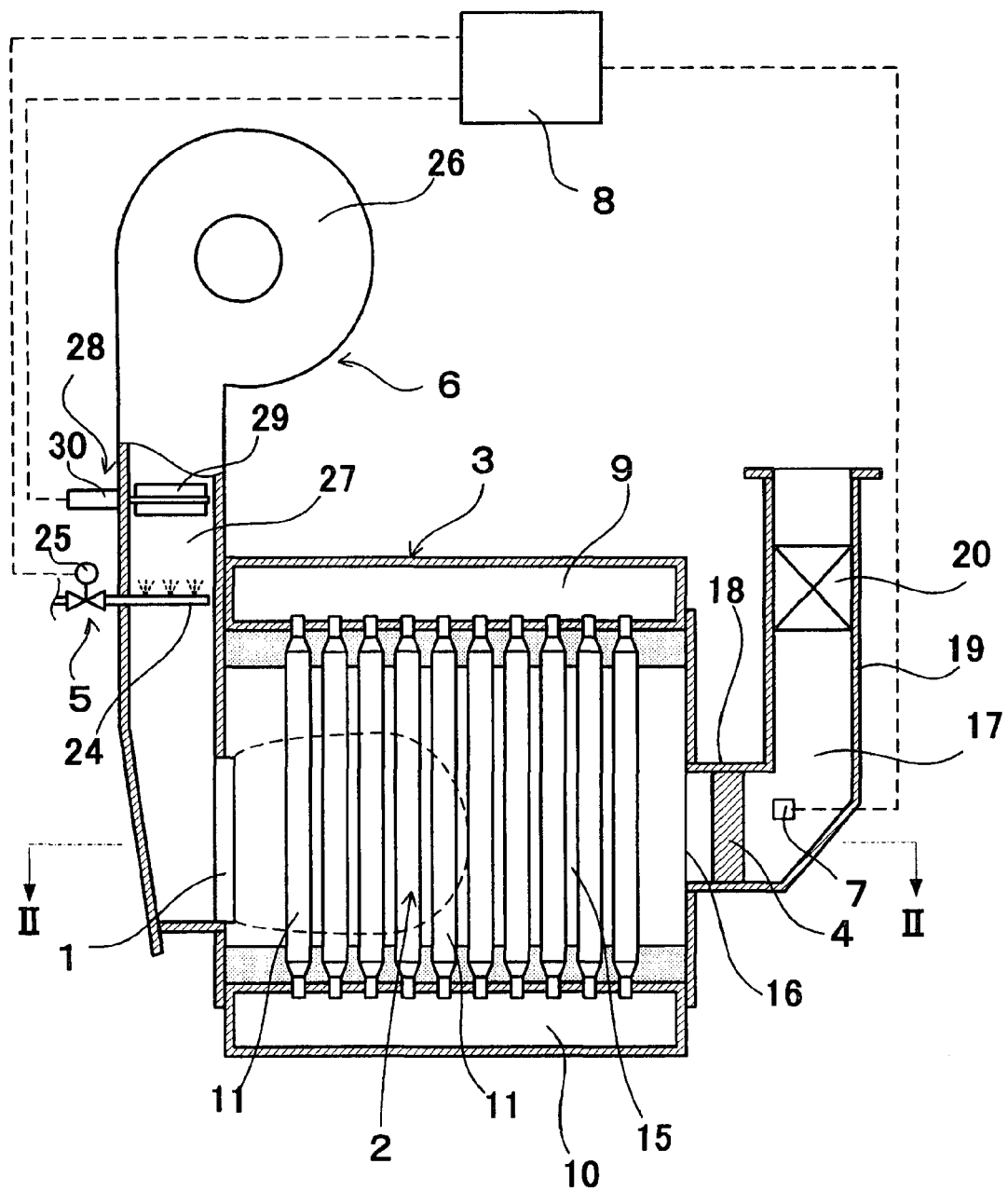

[Fig.2]
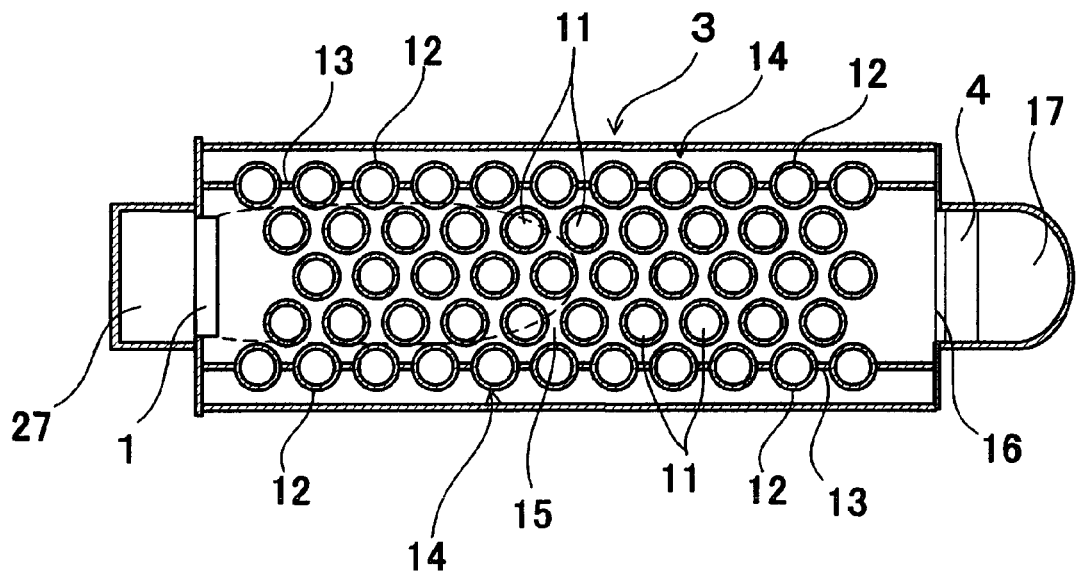
[Fig.3]
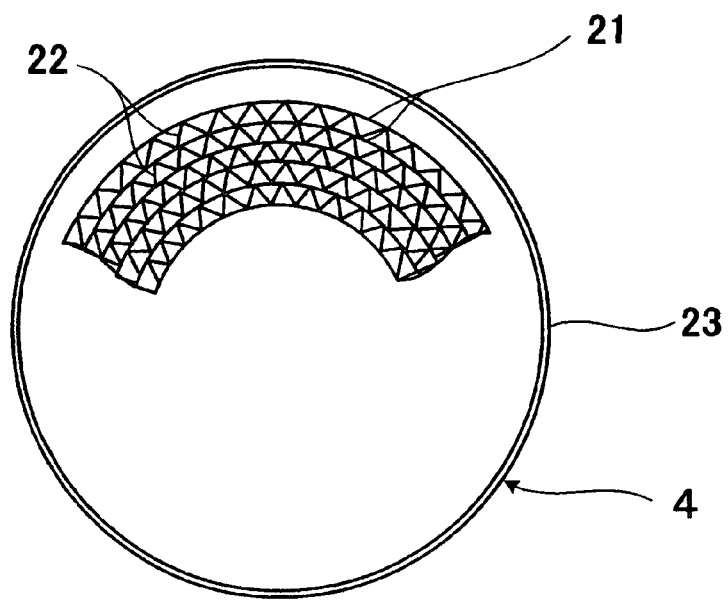

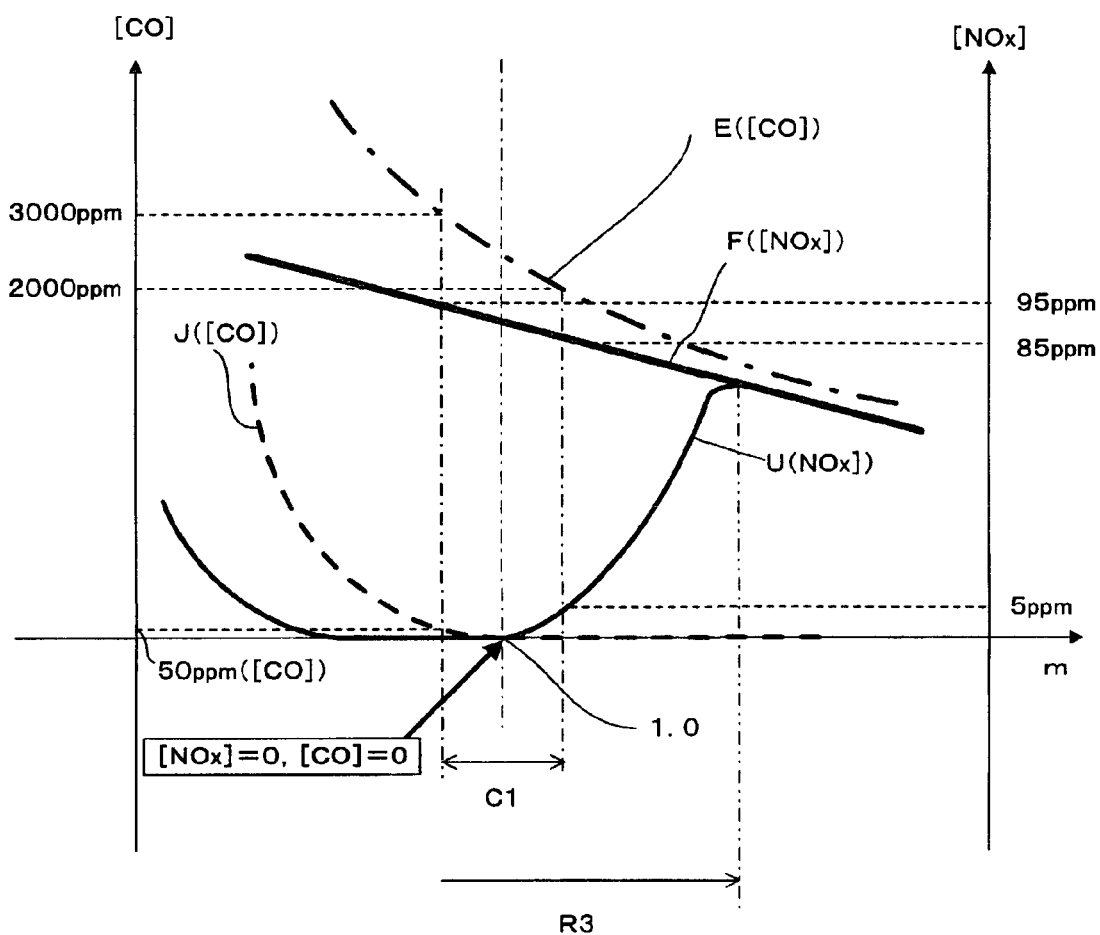

[Fig.5]
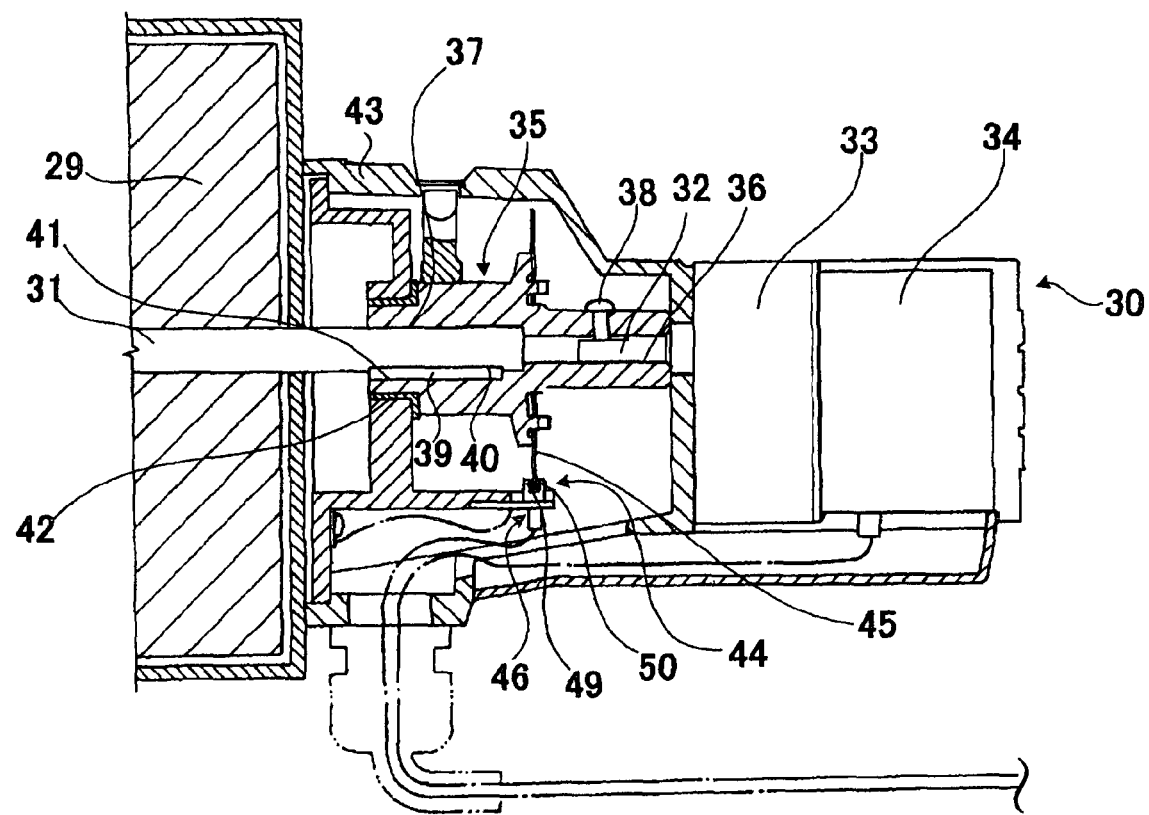

[Fig.6]
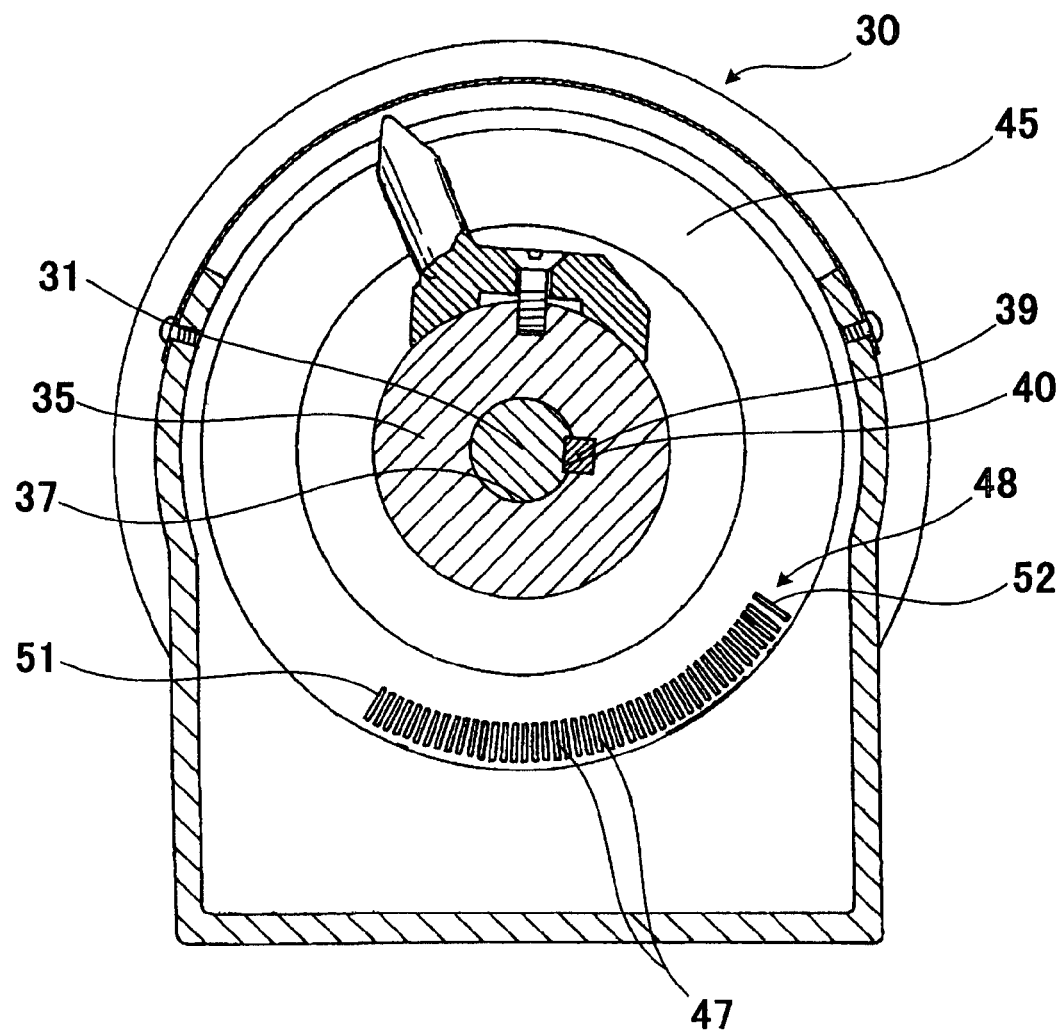

[Fig.7]
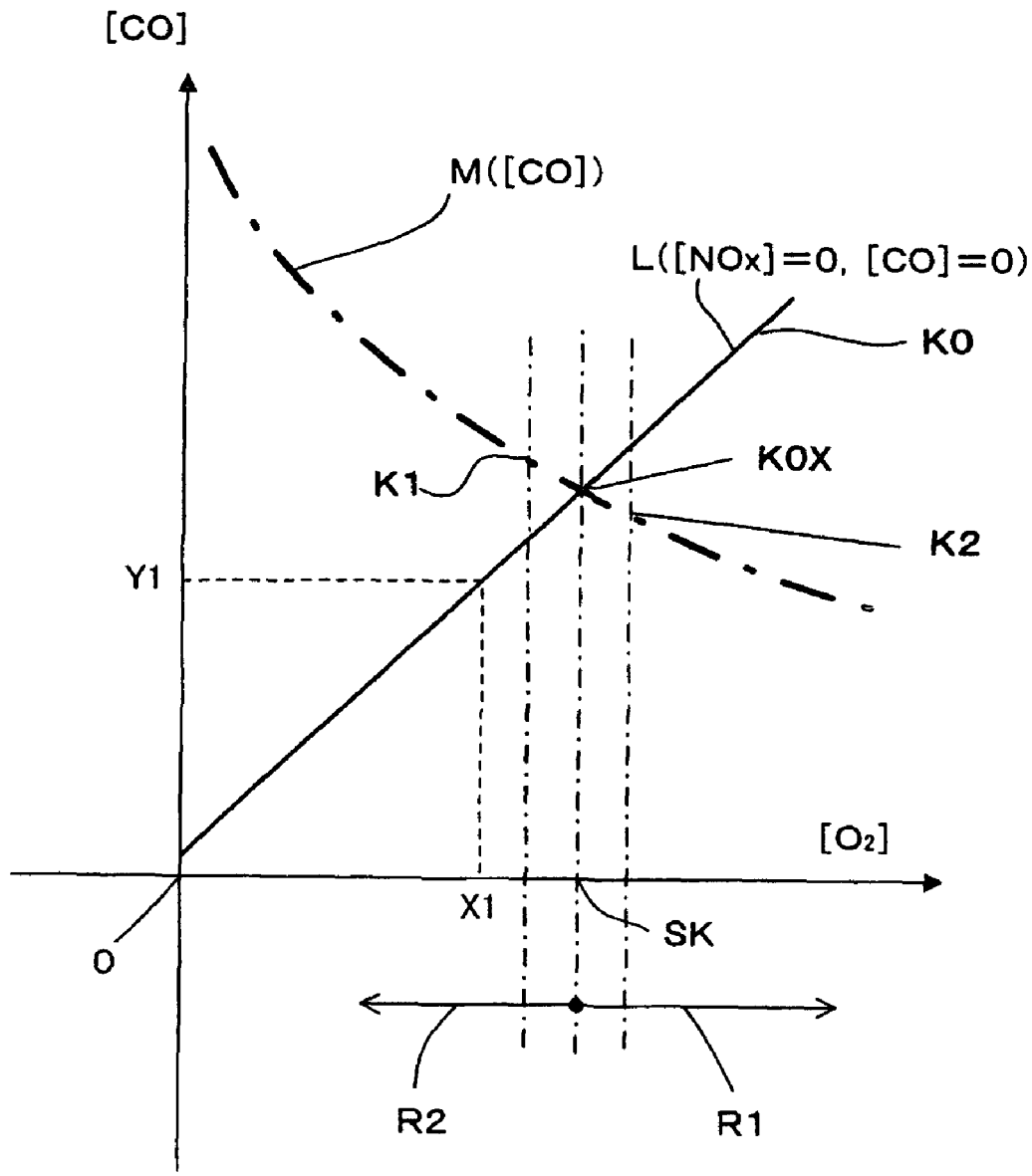

[Fig.8]
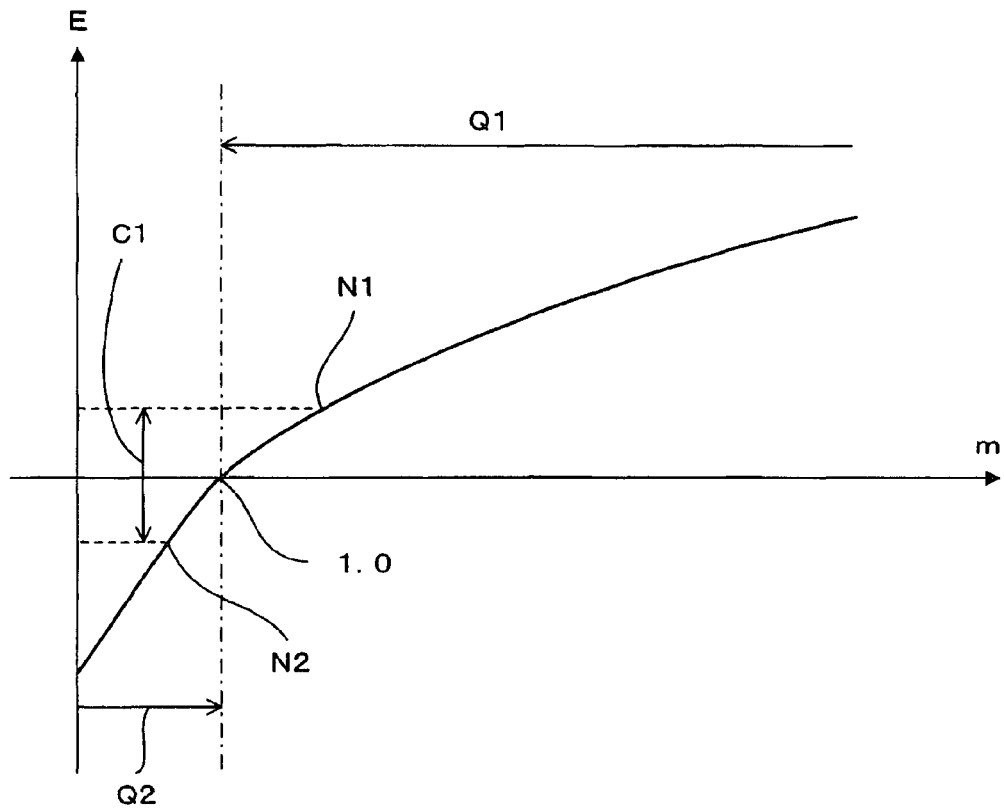
[Fig.9]
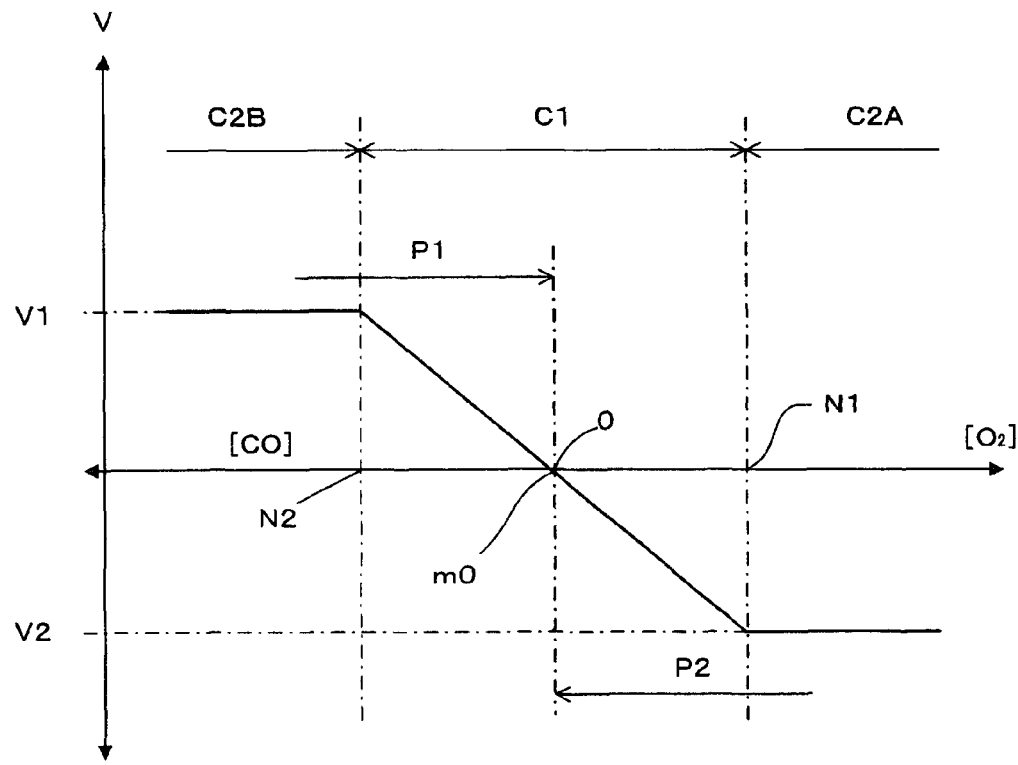

FIG. 10

| Concentration Ratio | Adjustment | | NOx Concentration (ppm) | CO Concentration (ppm) | O₂ Concentration (ppm) |
|---|---|---|---|---|---|
| 0.91 | Adjustment 1 | Before Pass-Through | 88 | 3114 | 1380 |
| | | After Pass-Through | 0.4 | 103.0 | «100 |
| 1.01 | Adjustment 0 | Before Pass-Through | 89 | 2949 | 1450 |
| | | After Pass-Through | 1.0 | 66.0 | «100 |
| 1.44 | Adjustment 0 | Before Pass-Through | 89 | 2461 | 1730 |
| | | After Pass-Through | 0.0 | 18.0 | «100 |
| 1.63 | Adjustment 0 | Before Pass-Through | 89 | 2914 | 1920 |
| | | After Pass-Through | 0.0 | 9.0 | «100 |
| 1.84 | Adjustment 0 | Before Pass-Through | 89 | 2250 | 2030 |
| | | After Pass-Through | 0.8 | 11.0 | «100 |
| 2.18 | Adjustment 2 | Before Pass-Through | 88 | 2069 | 2210 |
| | | After Pass-Through | 26.1 | 1.0 | «100 |
| 2.55 | Adjustment 2 | Before Pass-Through | 88 | 1922 | 2410 |
| | | After Pass-Through | 57.2 | 1.1 | 510 |
| 5.11 | | Before Pass-Through | 87 | 1360 | 3430 |
| | | After Pass-Through | 78.9 | 0.0 | 2220 |

[Fig.11]
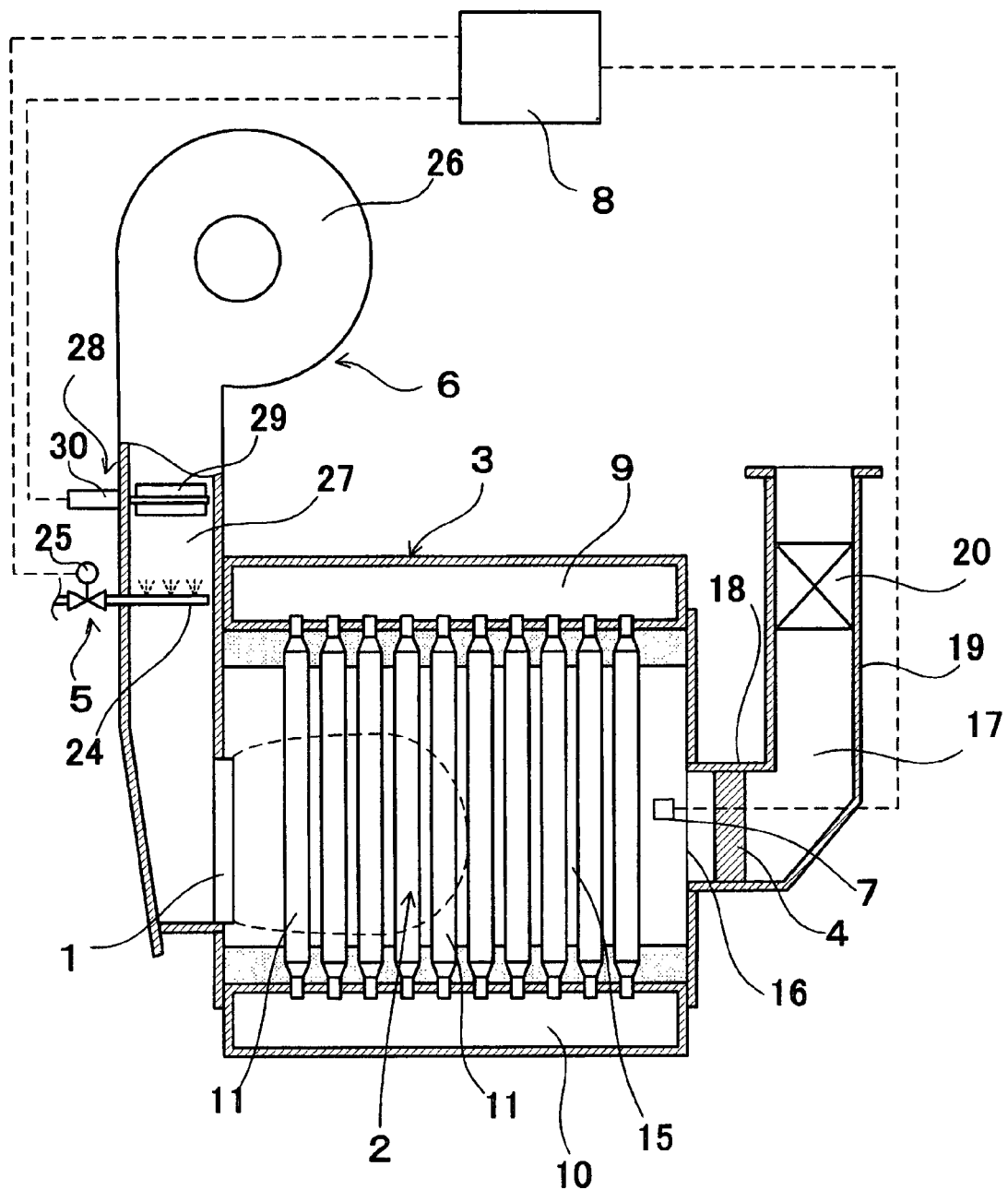

[Fig.12]
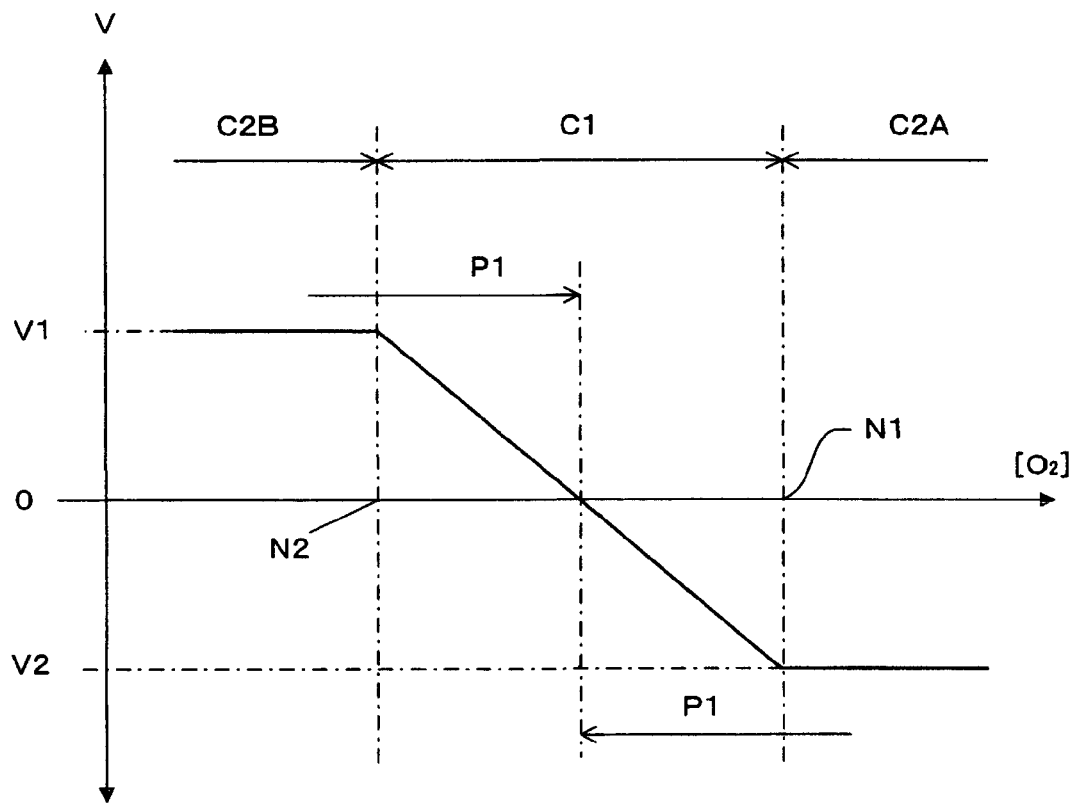

[Fig.13]
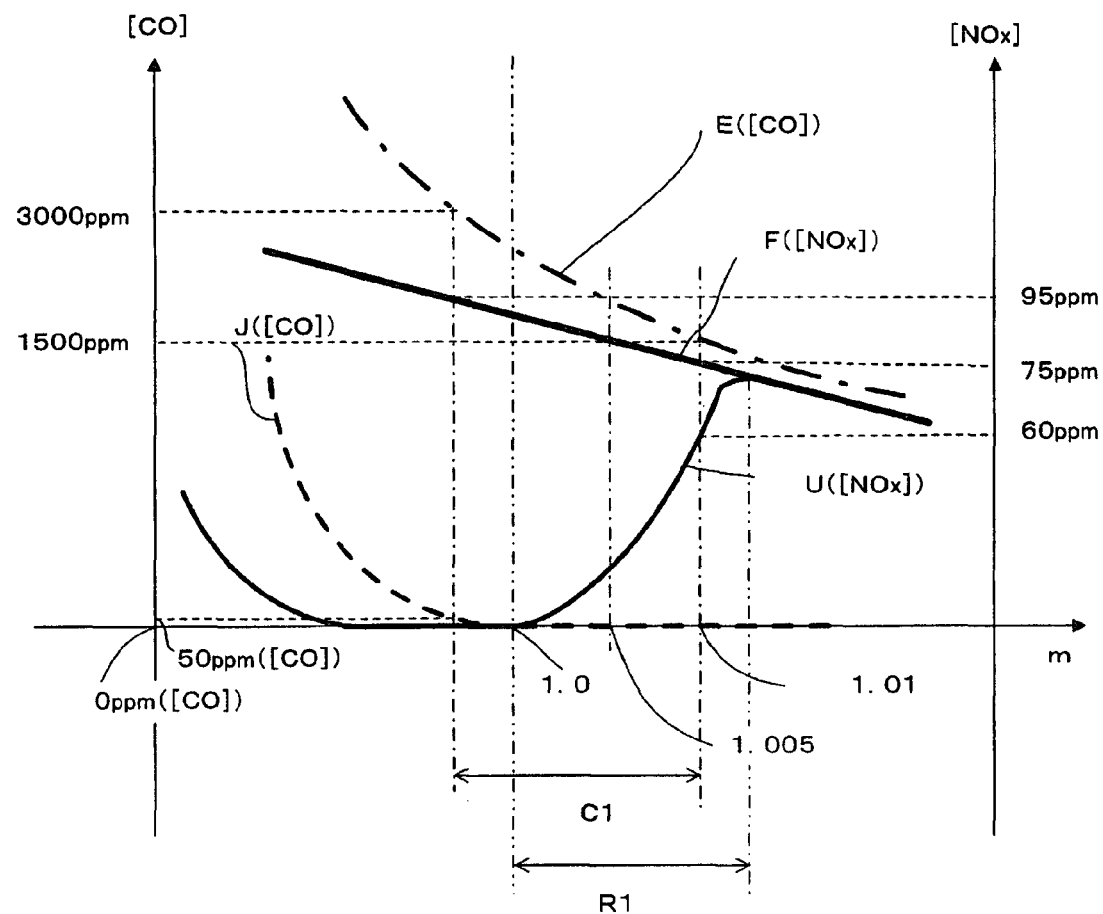

[Fig.14]
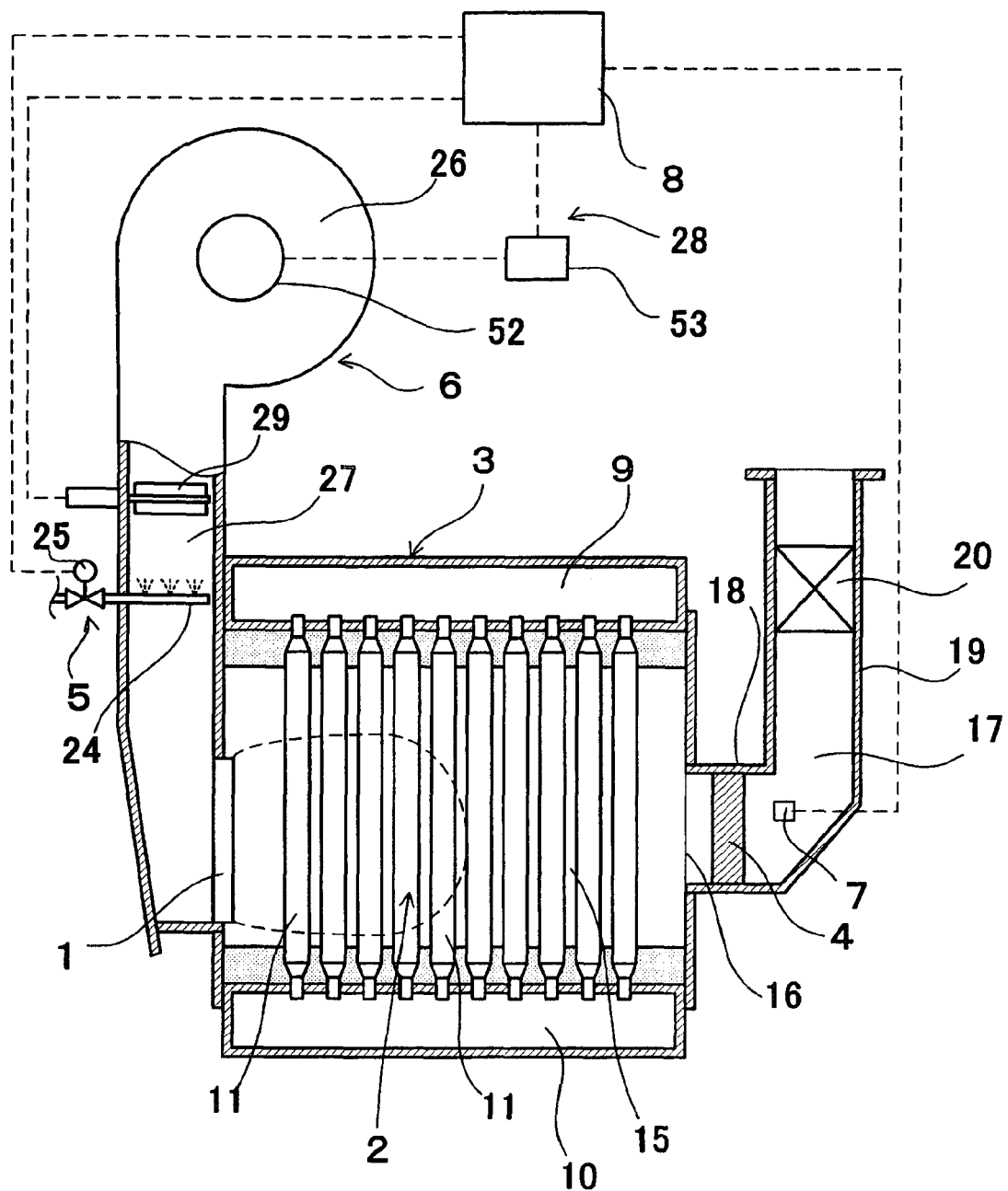

[Fig.15]
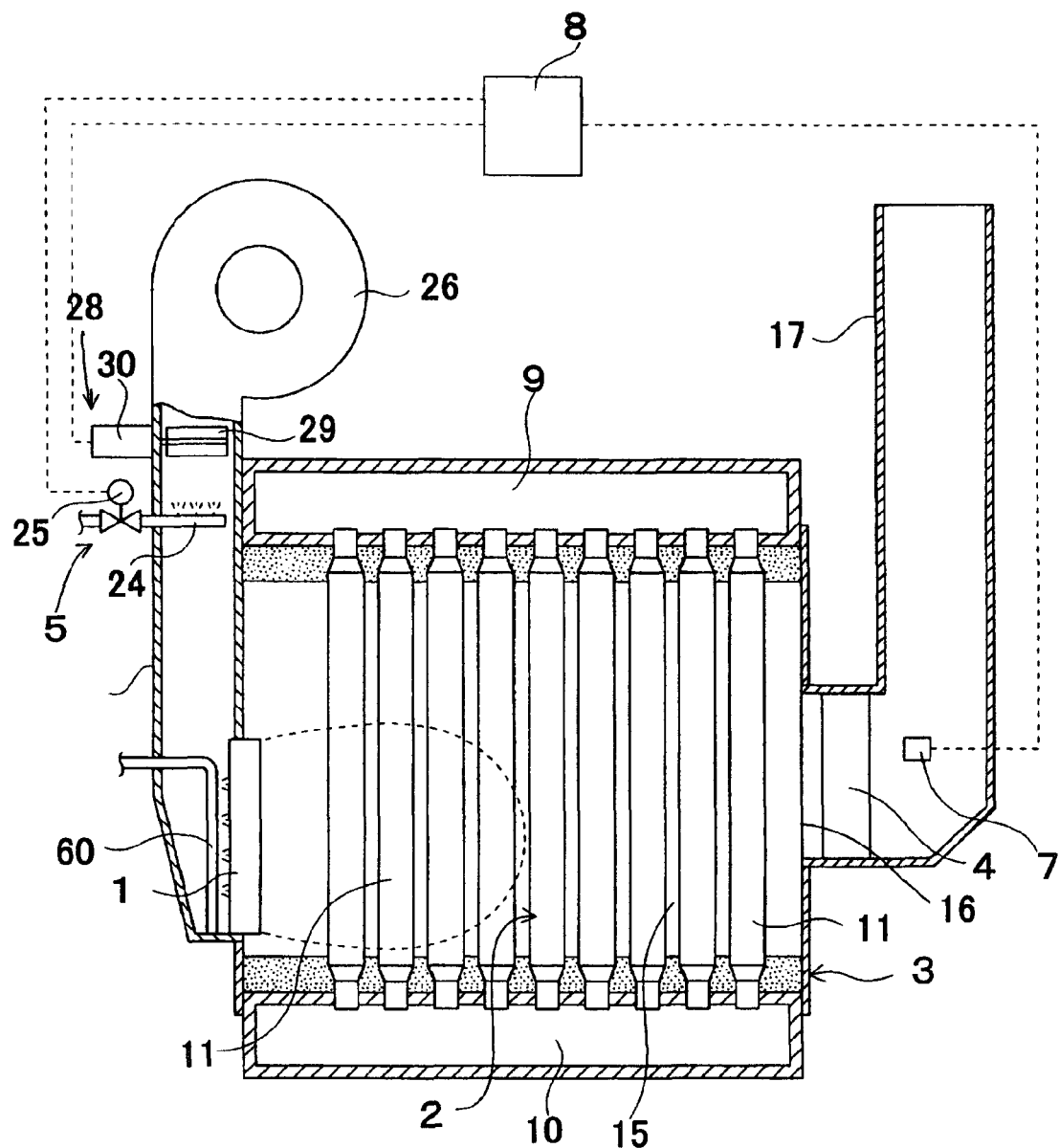

[Fig.16]
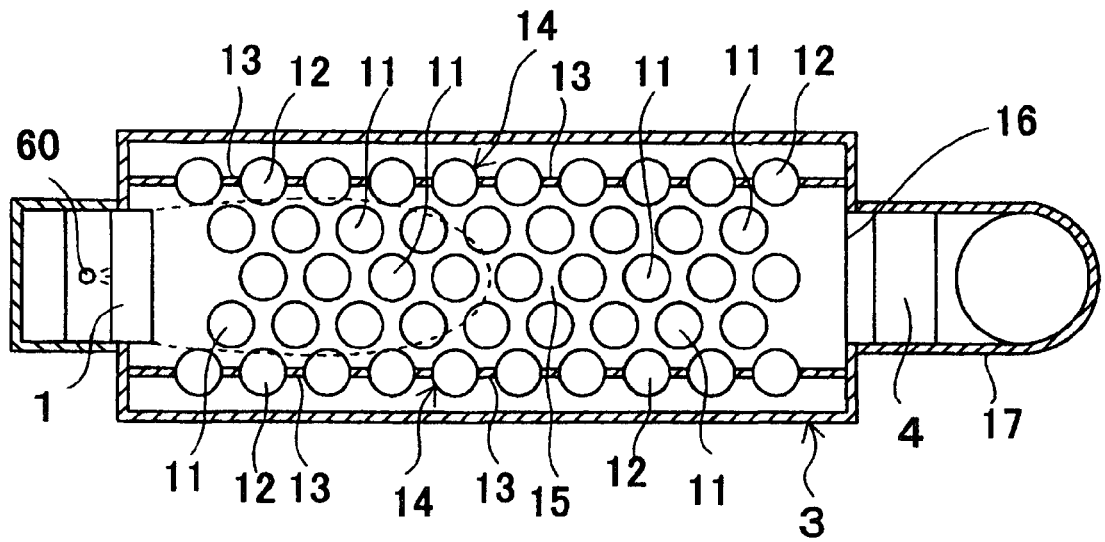
[Fig.17]
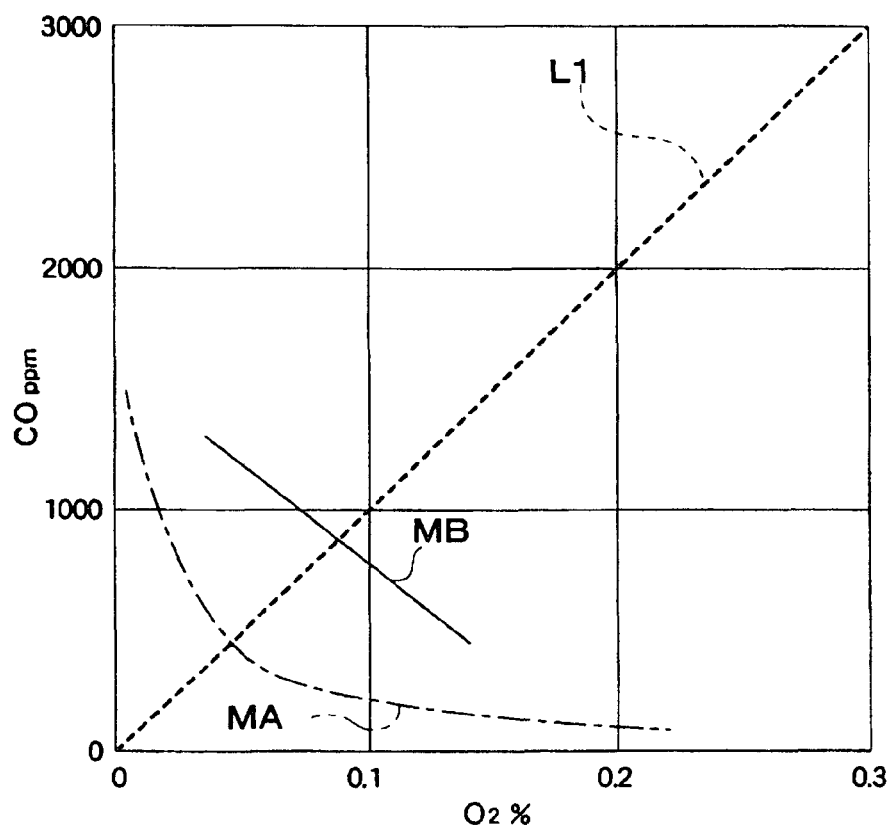

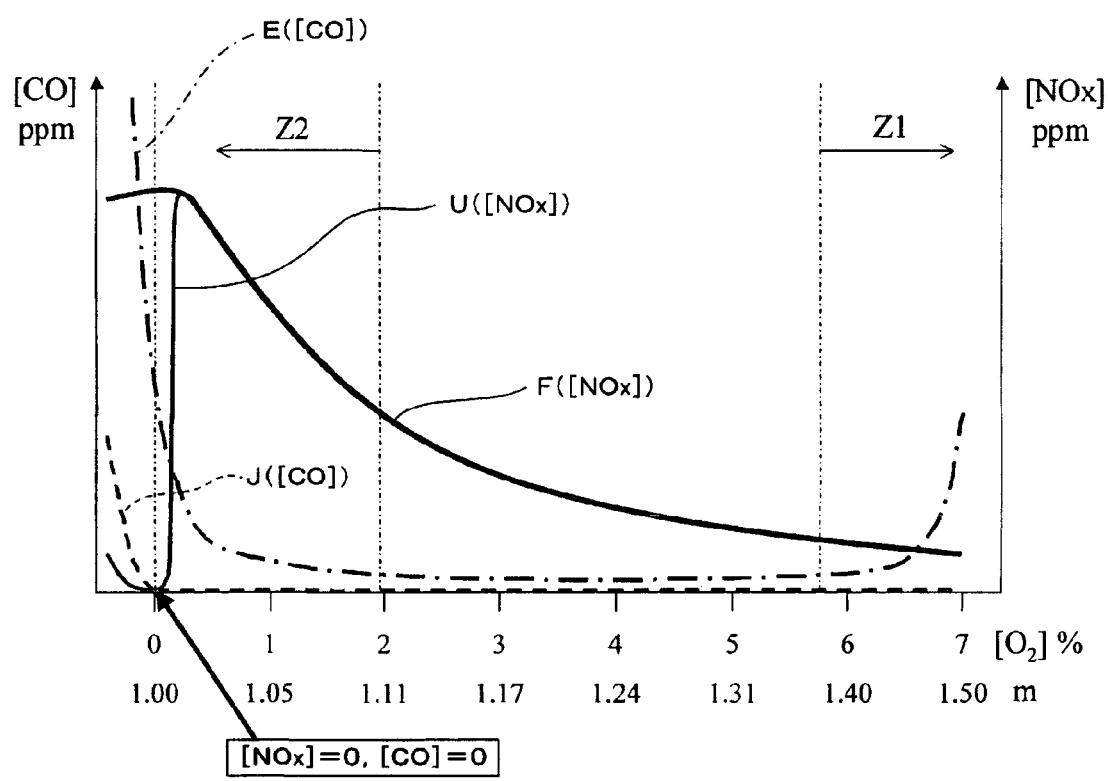
[Fig.18]

COMBUSTION METHOD AND COMBUSTION APPARATUS

TECHNICAL FIELD

The present invention relates to a combustion method and a combustion apparatus employed in a water-tube boiler and a regenerator of an absorption refrigerator.

BACKGROUND ART OF THE INVENTION

Generally known principles of suppressing NOx emissions include the suppression of flame (combustion gas) temperatures and a decrease in retention time of combustion gas at high-temperatures. As such, various technologies are available for decreasing the emission of NOx by applying these principles. Various methods have been proposed and put into practical use, for example, two-stage combustion, lean-rich combustion, exhaust gas recirculate combustion, water mixing combustion, steam injection combustion, and flame cooling combustion by a water tube group.

Moreover, NOx sources relatively small in capacity such as water-tube boilers are also beginning to be required for a further decrease in emission of NOx due to an increasing awareness of environmental problems. In this case, the decrease in NOx generation inevitably entails an increased amount of emitted CO, thus making it difficult to attain a simultaneous decrease in NOx and CO.

A cause of the above problem is that a simultaneous decrease in emission of NOx and CO is technically incompatible. More specifically, when temperatures of combustion gas are abruptly lowered and kept at temperatures of 900° C. or less in an attempt to decrease the emission of NOx to result in an ample generation of CO, the thus generated CO is emitted before oxidization to increase the amount of emitted CO. In other words, temperatures of combustion gas are kept higher in an attempt to decrease the amount of emitted CO, thus resulting in an insufficient suppression of NOx generation.

In order to solve the above problem, the applicant has proposed low NOx and low CO emission technologies for decreasing as much as possible the amount of CO, which is generated in accordance with a decrease in the amount of NOx generation, and also suppressing temperatures of combustion gas so as to attain oxidation of the thus generated CO. The technologies are now commercially feasible (refer to Patent Documents 1 and 2). However, an actual value of emitted NOx remains to be about 25 ppm in the low NOx emission technologies described in Patent Documents 1 and 2.

In order to solve the above problem, the applicant has proposed a low NOx combustion method in which a NOx decreasing step is conducted to suppress temperatures of combustion gas so as to give priority to suppression of NOx generation rather than a decrease in the amount of emitted CO, thereby keeping the value of the thus generated NOx to a predetermined value or lower, and a CO decreasing step is, thereafter, conducted so as to keep the value of CO emitted from the NOx decreasing step to a predetermined value or lower (refer to Patent Documents 3 and 4). The technologies disclosed in Patent Documents 3 and 4 are able to decrease the amount of emitted NOx to a value lower than 10 ppm, but find it difficult to decrease the amount of emitted NOx to a value below 5 ppm. This is due to the fact that combustion characteristics inevitably entail NOx generation at 5 ppm or greater.

Then, in the low NOx emission technologies disclosed in Patent Documents 3 and 4, as shown in FIG. 18, combustion is conducted at a high air-ratio combustion region Z1 where the air ratio is 1.38 or greater. In contrast, at a combustion region Z2 where the air ratio is 1.1 or lower (hereinafter, referred to as "low air ratio"), nitrogen oxides are generated in an increased amount, thus making it difficult to attain a simultaneous decrease in the amount of emitted NOx and CO. There is also posed a difficulty in controlling a stable combustion due to a possible occurrence of backfire where the air ratio is 1 or lower. Therefore, the low air-ratio combustion region Z2 has hardly been subjected to research and development. In FIG. 18, the lines F and E graphically show NOx characteristics and CO characteristics on a primary side of a combustion apparatus of the present invention, respectively, and the lines U and J graphically show NOx characteristics and CO characteristics of the combustion apparatus of the present invention, respectively. Both of the low NOx emission technologies on a secondary side disclosed in Patent Documents 3 and 4 are in principle those in which a burner is used to conduct combustion at the high air ratio region Z1, thereby suppressing the generation of NOx and removing the thus generated CO through an oxidation catalyst.

On the other hand, there is a growing demand for operating boilers at a low air ratio not only to attain a greater decrease in emitted NOx but also to save energy.

The inventors of the present application have been engaged in research and development of a combustion method of decreasing the amount of emitted nitrogen oxides to zero as much as possible by use of an oxidation catalyst.

Moreover, the method disclosed in Patent Document 5 is known as that of treating nitrogen oxide-containing gas generated on combustion by a burner.

According to the method of treating exhaust gas as described in Patent Document 5, in a first step, a burner is used to conduct combustion at an air ratio lower than 1.0 (the amount of combustible air lower than the theoretical amount of air), thereby combustion exhaust gas in which oxygen is not contained but unburned components such as CO and HC (hydrocarbons) are contained, and a nitrogen oxide reducing catalyst is used to reduce nitrogen oxides by unburned components, thereby purifying the nitrogen oxides. Then, in a second step, air is supplied to exhaust gas after purification, thereby purifying the unburned components by using an oxidation catalyst.

The treatment method as disclosed in Patent Document 5 is not a method for decreasing carbon monoxide and nitrogen oxides in the presence of oxygen. Further, according to the method as described in Patent Document 5, in a step of reducing nitrogen oxides, a catalyst is used, which is different from that used in a step of oxidizing unburned components, resulting in a complicated constitution of an apparatus and a subsequent difficulty in maintenance and management of the apparatus.

Further, Patent Document 6 describes a method for purifying nitrogen oxide-containing gas emitted from a gas engine. In the method as described in Patent Document 6, a three-way catalyst is used to purify nitrogen oxides and carbon monoxide, which essentially requires the presence of hydrocarbons in gas and is applicable only to gas at a theoretical air ratio in which no excess oxygen is present. Therefore, the treatment method as described in Patent Document 6 is not appropriately used in treating combustion gas resulting from a boiler, which occurs on combustion by a burner and contains excess oxygen.

Still further, Patent Document 7 discloses a technology in which an oxidation catalyst is used to reduce nitrogen oxides contained in exhaust gas derived from an incinerator by carbon monoxide. According to the technology described in Patent Document 7, since nitrogen oxides are not reduced in the presence of oxygen in exhaust gas, fuel is burned at an excessively high concentration (air ratio of less than 1) on primary combustion, by which exhaust gas is kept deprived of oxygen. The technology described in Patent Document 7 is subjected to such restriction that fuel is burned at an excessively high concentration, thus making it difficult to find an application for the combustion apparatus such as a burner-equipped boiler in which oxygen is contained in exhaust gas.

Patent Document 1: Japanese Patent No. 3221582
Patent Document 2: U.S. Pat. No. 5,353,748
Patent Document 3: Japanese unexamined Patent Application, First Publication No. 2004-125378
Patent Document 4: U.S. Pat. No. 6,792,895
Patent Document 5: Japanese unexamined Patent Application, First Publication No. 2001-241619
Patent Document 6: Japanese unexamined Patent Application, First Patent Document 5-38421
Patent Document 7: Japanese unexamined Patent Application, First Publication No. 2003-275543

DETAILED DESCRIPTION OF THE INVENTION

Problem to be Solved by the Invention

A problem to be solved by the present invention is to decrease the amount of emitted nitrogen oxides and emitted carbon monoxide to zero as much as possible or a permissible value by using a simple method, and also to obtain stable effects on decrease in hazardous substances by a detection of oxygen concentration.

Means for Solving the Problem

The inventors of the present application have earnestly conducted research for solving the above problem, finding a point at which the amount of emitted nitrogen oxides and carbon monoxide is decreased to substantially zero in a burner combustion region at a low air ratio as close to 1 as possible (the region Z2 in FIG. 18), for which research has been so far hardly conducted for a boiler equipped with an oxidation catalyst to decrease carbon monoxide as described in Patent Documents 3 and 4.

As a result, they have studied causes for which the amount of emitted nitrogen oxides and carbon monoxide can be decreased to substantially zero, thus obtaining a new finding that a concentration ratio of oxygen, nitrogen oxides, and carbon monoxide on the primary side of the oxidation catalyst is given as a predetermined reference concentration ratio, thereby an oxidation catalyst is used to decrease the amount of emitted nitrogen oxides and carbon monoxide as close to zero as possible, and at the same time, the concentration ratio is adjusted in the vicinity of the predetermined reference concentration ratio, thereby obtaining a new finding that the amount of emitted hazardous substances (nitrogen oxides and carbon monoxide) can be decreased to substantially zero or a permissible value. The present invention has been completed on the basis of these findings. According to the present invention, it is possible not only to decrease the concentration of emitted hazardous substances to substantially zero but also to attain a remarkable energy savings due to the fact that the above decrease can be obtained at an air ratio as close to 1.0 as possible.

Hereinafter, a simple reference of concentration ratio means a concentration ratio of oxygen, nitrogen oxides, and carbon monoxide on the primary side of the oxidation catalyst. The oxidation catalyst may include any known oxidation catalyst or a new oxidation catalyst.

In other words, the inventors of the present application have broken through technical common sense that oxygen is a barrier for reduction of nitrogen oxides by carbon monoxide on the basis of actions of an oxidation catalyst, as described in Patent Document 7 and used new technological approaches for utilizing oxygen to adjust a concentration relationship between oxygen, nitrogen oxides, and carbon monoxide on the primary side of the oxidation catalyst to a predetermined relationship (predetermined concentration ratio), thus finding a solution for the above problem.

Further, another problem to be solved by the present invention is to provide a sensor having a high resolution and a high response in order to control the concentration ratio constant, by setting the changing range of the predetermined reference concentration ratio to a minimum, so that the concentration of nitrogen oxides on the secondary side of the oxidation catalyst is decreased to substantially zero.

As described above, the inventors of the present application have newly found that the concentration can be controlled to be the predetermined reference concentration ratio constantly by allowing oxygen to be contained positively on the primary side of the oxidation catalyst to decrease the concentration of oxygen on the secondary side of the oxidation catalyst to be substantially zero. According to the present invention, based on the finding, the concentration of oxygen on the secondary side of the oxidation catalyst is detected and the detected concentration of oxygen is controlled to be substantially zero, whereby the above-mentioned problem can be solved. Although the concentration of nitrogen oxides on the secondary side of the oxidation catalyst can be controlled to be substantially zero even by a sensor detecting the concentration of nitrogen oxides, an inexpensive sensor with a high resolution and a high response has not been found at present.

As described above, the present invention is an epoch-making invention which is not only remarkable in the effect of decreasing hazardous substances but also can solve the above-mentioned problem easily even by using a conventional burner, an oxidation catalyst, an oxygen concentration sensor, and the control of an air ratio, or using a technology that is an extension thereof. According to the present invention, although the gas generating source is preferably a burner, the gas generating source is not limited to a burner as long as the principle of the present invention capable of decreasing the concentration of nitrogen oxides on the secondary side of the oxidation catalyst to substantially zero by setting the concentration ratio to be the predetermined reference concentration ratio is applicable.

A first invention according to the present invention provides a combustion method, including: a concentration ratio adjusting step of adjusting a concentration ratio of nitrogen oxides, carbon monoxide, and oxygen in a gas containing nitrogen oxides, carbon monoxide, and oxygen from a gas generation source to a predetermined reference concentration ratio; and a hazardous-substance decreasing step of decreasing nitrogen oxides, using an oxidation catalyst having characteristics of coming into contact with the gas to oxidize carbon monoxides by oxygen and reduce nitrogen oxides by carbon monoxide, and decreasing concentrations of nitrogen oxides and carbon monoxide on a secondary side to substantially zero when the concentration ratio on a primary side is set to the predetermined reference concentration ratio. Further, the concentration ratio adjusting step detects a concentration of oxygen on the secondary side of the oxidation catalyst to control the concentration ratio so that a detected oxygen concentration becomes a set oxygen concentration substantially close to zero. Herein, "the detected concentration of oxygen is substantially close to zero" includes not only the concentration of oxygen at which the concentrations of nitrogen oxides and carbon monoxide on the secondary side of the oxidation catalyst are decreased to substantially zero, but also the concentration of oxygen at which the concentration of nitrogen oxides and carbon monoxide on the secondary side of the oxidation catalyst are decreased to a predetermined value or less.

Further, the concentration of nitrogen oxides being substantially zero means that the concentration is preferably 5 ppm, more preferably 3 ppm, and still more preferably zero. The concentration of carbon monoxide being substantially zero means that the concentration is 30 ppm and more preferably 10 ppm. Further, the concentration of oxygen being substantially zero means that the concentration is 100 ppm or less, and preferably a measurement limit value or less. Further, the concentrations of nitrogen oxides and carbon monoxide being predetermined values or less means that the concentrations are equal to or less than emission standard concentrations determined by each country and each region, and it should be appreciated that the concentrations are preferably set to be values close to zero as much as possible. More specifically, "a predetermined value" or less can be referred to as "a permissible value", "an emission standard value".

According to the present invention, the concentration of the gas is set to be the predetermined concentration ratio in the concentration ratio adjusting step, whereby the concentration of nitrogen oxides on the secondary side of the oxidation catalyst can be decreased to zero or a predetermined value or less, and the concentration of carbon monoxide can be decreased to substantially zero or a predetermined value or less, using the oxidation catalyst. Further, by allowing oxygen to be contained in the gas on the primary side of the oxidation catalyst, the predetermined reference concentration ratio can be controlled to be constant by detecting the concentration of oxygen. According to the technology in which the gas on the primary side of the oxidation catalyst is set to be a state free of oxygen as in Patent Document 7, the concentration of oxygen cannot be detected to adjust a concentration ratio.

According to the first invention, the concentration ratio adjusting step desirably detects concentrations of oxygen and carbon monoxide on the secondary side of the oxidation catalyst to control the concentration ratio so that a detected oxygen concentration becomes a set oxygen concentration substantially close to zero.

In this case, when the concentration ratio becomes exactly the predetermined reference concentration ratio, the oxidation catalyst can decrease the concentration of oxygen on the secondary side to substantially zero due to the characteristics thereof. However, when the concentration ratio fluctuates from the predetermined reference concentration, the concentration of carbon monoxide is detected at the concentration of oxygen of zero on the secondary side of the oxidation catalyst. Therefore, by detecting the concentration of carbon monoxide as well as the concentration of oxygen, the concentration of oxygen on the secondary side of the oxidation catalyst can be controlled to be zero easily.

A second invention according to the present invention provides a combustion apparatus including: a concentration ratio adjusting device of adjusting a concentration ratio of nitrogen oxides, carbon monoxide, and oxygen in a gas containing nitrogen oxides, carbon monoxide, and oxygen from a gas generation source to a predetermined reference concentration ratio; and an oxidation catalyst having characteristics of coming into contact with the gas to oxidize carbon monoxide by oxygen and reduce nitrogen oxides by carbon monoxide, and decreasing concentrations of nitrogen oxides and carbon monoxide on a secondary side to substantially zero when the concentration ratio on a primary side is set to the predetermined reference concentration ratio. Further, the apparatus includes a sensor for detecting a concentration of oxygen on the secondary side of the oxidation catalyst, and the concentration ratio adjusting device controls the concentration ratio so that a detected oxygen concentration by the sensor is decreased to a set oxygen concentration substantially close to zero.

According to the present invention, by setting the concentration ratio of the gas to be the predetermined concentration ratio by the concentration ratio adjusting device, the concentration of nitrogen oxides on the secondary side of the oxidation catalyst can be decreased to substantially zero or a predetermined value or less and the concentration of carbon monoxide can be decreased to substantially zero or a predetermined value or less, using the oxidation catalyst. Further, by allowing oxygen to be contained in the gas on the primary side of the oxidation catalyst, the predetermined reference concentration ratio can be controlled to be constant by detecting the concentration of oxygen by the sensor, so that a sensor having a high resolution and a high response can be used.

According to the second invention, the sensor desirably includes a sensor for detecting concentrations of oxygen and carbon monoxide on the secondary side of the oxidation catalyst, and the concentration ratio adjusting device desirably controls the concentration ratio so that the detected oxygen concentration by the sensor is decreased to a set oxygen concentration substantially close to zero.

According to the present invention, in addition to the effect of the second invention, the concentration of oxygen on the secondary side of the oxidation catalyst can be easily controlled to substantially zero by detecting the concentration of carbon monoxide together, and an inexpensive air-fuel ratio sensor having a high resolution and a high response, which is used in an automobile and the like, can be used.

Effects of the Invention

According to the present invention, by adjusting the concentration ratio, the emission amounts of nitrogen oxides and carbon monoxide can be decreased to close to zero as much as possible, or a predetermined value or less, using the oxidation catalyst. Further, the concentration ratio can be controlled to be the predetermined reference concentration ratio by detecting the concentration of oxygen on the secondary side of the oxidation catalyst, so a sensor having a high resolution and a high response can be used.

BRIEF DESCRIPTION OF THE DRAWINGS

FIG. 1 is a longitudinal sectional view for explaining a steam boiler of Embodiment 1.

FIG. 2 is a sectional view taken along line II to II in FIG. 1.

FIG. 3 is a view showing a constitution of major parts when an oxidation catalyst given in FIG. 2 is viewed from a direction in which exhaust gas flows.

FIG. 4 is a drawing showing characteristics of air ratio-NOx/CO in Embodiment 1.

FIG. 5 is a partial sectional view for explaining a damper position adjusting device of Embodiment 1, which is in operation.

FIG. 6 is a sectional view for explaining major parts of the damper position adjusting device.

FIG. 7 is a pattern diagram for explaining characteristics of a burner and an endothermic device and those of a catalyst given in Embodiment 1.

FIG. 8 is a drawing for explaining the output characteristics of a sensor given in Embodiment 1.

FIG. 9 is a drawing for explaining motor controlling characteristics in Embodiment 1.

FIG. 10 is a drawing for explaining NOx and CO decreasing characteristics in Embodiment 1.

FIG. 11 is a longitudinal sectional view for explaining a steam boiler of Embodiment 2.

FIG. 12 is a drawing for explaining motor controlling characteristics in Embodiment 2.

FIG. 13 is a drawing for explaining an air ratio control by using characteristics of air ratio-NOx/CO in Embodiment 3.

FIG. 14 is a longitudinal sectional view for explaining a steam boiler of Embodiment 4.

FIG. 15 is a longitudinal sectional view for explaining steam boilers of Embodiment 5 and Embodiment 6.

FIG. 16 is a transverse sectional view for explaining FIG. 16 of Embodiment 5 and Embodiment 6.

FIG. 17 is a pattern diagram showing one example of combustion characteristics and others in a combustion apparatus of Embodiment 5.

FIG. 18 is a drawing for explaining primary characteristics and secondary characteristics of NOx and CO in the present invention.

DESCRIPTION OF THE REFERENCE SYMBOLS

1: burner
4: oxidation catalyst
7: sensor
8: controller
28: air-ratio adjusting device
29: damper
30: damper position adjusting device
34: motor

BEST MODE FOR CARRYING OUT THE INVENTION

Next, an explanation will be given for embodiments of the present invention. An explanation will be made for terms used in the present application before the embodiments of the present invention will be explained. "Gas" includes gas, which has completely passed from a burner through an oxidation catalyst (also referred to as "oxidation/reduction catalyst" or simply referred to as "catalyst"), and gas, which has passed through the catalyst, is referred to as "exhaust gas." Therefore, the gas includes that in which burning reactions are in progress (combustion process) and that in which the burning reactions are completed, and is also referred to as "combustion gas". Further, in the case where the catalyst is installed in multiple stages along the gas flow, the "gas" is defined as gas covering that which has completely passed through the catalyst at a final stage, and "exhaust gas" is defined as gas after passing through the catalyst at the final stage.

"A primary side of the catalyst" is a side where a burner is installed with respect to a catalyst, referring to immediately before the passage of gas through the catalyst unless otherwise specified, whereas "a secondary side of the catalyst" is a side opposite to the primary side of the catalyst.

Further, "free of hydrocarbons" does not mean that hydrocarbons will not be generated at all in a process of burning reactions, but means that hydrocarbons are generated to some extent during the process of burning reactions but hydrocarbons, which reduce nitrogen oxides are not substantially contained (lower than a measurement limit) in gas flowing into the catalyst at a stage where the burning reactions are completed.

Still further, an air ratio m is defined as $m=21/(21-[O_2])$. However, $[O_2]$ represents the concentration of oxygen in exhaust gas on the secondary side of the catalyst, but $[O_2]$ used in determining an air ratio represents the concentration of excess oxygen in an oxygen excess region and also represents as a negative value the concentration of insufficient oxygen necessary for burning unburned gas such as carbon monoxide at the air ratio $m=1$ in a fuel excess region.

Next, an explanation will be made for embodiments of the present invention. The present invention is applicable to a water-tube boiler such as a small through-flow boiler, a hot-water supply system, and a combustion apparatus (also referred to as thermal component or a combustion device) used in a regenerator for an absorption refrigerator.

(Embodiment 1 of Combustion Method)

A combustion apparatus such as boilers to which Embodiment 1 of the combustion method of the present invention is applicable is typically provided with, as main parts, a burner, a storage water heater body including a group of heat transfer tubes (water tubes) as endothermic device for absorbing heat from gas generated by the burner, an oxidation catalyst in which gas containing oxygen, nitrogen oxides, and carbon monoxide at predetermined concentration ratios after passing through the group of heat transfer tubes passes in contact, thereby oxidizing carbon monoxide and also reducing nitrogen oxides, fuel supply device for supplying fuel gas to the burner, combustible air supply device for supplying combustible air to the burner, a sensor for detecting the concentration of oxygen on the downstream of the oxidation catalyst, and a controller for inputting signals from the sensor or the like to control the fuel supply device and the combustible air supply device.

Embodiment 1 of the combustion method of the present invention carried out preferably in such a combustion apparatus is a combustion method including a concentration ratio adjusting step of allowing carbon monoxide and oxygen to be contained in a gas containing nitrogen oxides from a gas generation source, and adjusting the concentration ratio of nitrogen oxides, carbon monoxide, and oxygen in the gas to be a predetermined reference concentration ratio, and a hazardous-substance decreasing step of decreasing nitrogen oxides, using a catalyst having characteristics of coming into contact with the gas to oxidize carbon monoxide by oxygen and reduce the nitrogen oxides by carbon monoxide, and decreasing the concentrations of nitrogen oxides and carbon monoxide on a secondary side to substantially zero when the concentration ratio on a primary side is set to be the reference concentration ratio. The concentration ratio adjusting step detects the concentration of oxygen on the secondary side of the oxidation catalyst to control the concentration ratio so that a detected oxygen concentration becomes a set oxygen concentration substantially close to zero.

The concentration ratio in Embodiment 1 means the relative relationship of the concentrations of carbon monoxide, nitrogen oxides, and oxygen represented by formula (1) described later, in the same way as in Embodiment 2 described later.

In Embodiment 1 of the combustion method, the concentration ratio adjusting step includes a first step of allowing carbon monoxide and oxygen to be contained in a gas containing nitrogen oxides from a gas generation source and adjusting the concentration ratio to a predetermined reference concentration ratio, and a second step of detecting the concentration of oxygen on the secondary side of the catalyst to keep the predetermined reference concentration ratio constant. In any of the case where carbon monoxide and oxygen are contained in the gas from the gas generation source and the case where carbon monoxide and oxygen are not contained in the gas from the gas generation source, in the first step, the concentrations of carbon monoxide and oxygen are adjusted with respect to the concentration of nitrogen oxides so that the concentration ratio becomes the predetermined reference concentration ratio by injecting oxygen and/or carbon monoxide. Thus, the concentrations of nitrogen oxides and carbon monoxide on the secondary side of the oxidation catalyst are decreased substantially. Further, the concentration ratio is changed with respect to the predetermined reference concentration ratio, whereby a first control of decreasing the concentration of nitrogen oxides to substantially zero and setting the concentration of carbon monoxide to be a predetermined value or less, and a second control of decreasing the concentration of carbon monoxide to substantially zero and setting the concentration of nitrogen oxides to be a predetermined value or less are performed selectively. In addition, the second step is conducted to detect the concentration of oxygen, whereby the predetermined reference concentration ratio can be kept to be constant.

Further, in the case where a burner is used as the gas generation source, preferably, only burner characteristics or the characteristics of a burner and an endothermic device are used in the first step. Then, an air ratio is obtained by an air-ratio adjusting device of adjusting the ratio between the amounts of a fuel and combustible air to the burner, whereby the concentration ratio adjusting device is constituted. Thus, an injection or removal device of oxygen and/or carbon monoxide is not required.

Further, it is preferred that hydrocarbon be not contained in gas flowing to the catalyst. This condition can be realized easily by burning a fuel containing hydrocarbon in the gas generation source. Further, even in the case where a slight amount of hydrocarbon is contained in a gas flowing to the catalyst is included in the embodiment of the present invention, as long as the function of the present invention of decreasing the concentrations of nitrogen oxides and carbon monoxide on the secondary side of the oxidation catalyst to substantially zero.

(Embodiment 2 of Combustion Method)

Embodiment 1 of the combustion method is applied to the following Embodiment 2. Even in Embodiment 2, the concentration of oxygen on the secondary side of the catalyst is detected to control the predetermined reference concentration ratio in the same way as in Embodiment 1, and the description thereof will be omitted. Embodiment 2 is a combustion method for allowing gas generated on combustion of fuel in a burner to be in contact with an oxidation catalyst, thereby decreasing nitrogen oxides contained in the gas. The combustion method includes a combustion step in which hydrocarbon-containing fuel is burned in the burner to generate a gas free of hydrocarbons but containing oxygen, nitrogen oxides, and carbon monoxide, an endothermic step in which endothermic device is used to absorb heat from a gas generated in the combustion step, a hazardous-substance decreasing step in which the gas is brought into contact with an oxidation catalyst after the endothermic step to oxidize carbon monoxide contained in the gas by oxygen and reduce nitrogen oxides by carbon monoxide, and a concentration ratio adjusting step in which a concentration ratio of oxygen, nitrogen oxides, and carbon monoxide in gas on the primary side of the oxidation catalyst is adjusted to a predetermined concentration ratio at which the concentration of nitrogen oxides on the secondary side of the catalyst is decreased to substantially zero or a predetermined value or less and the concentration of carbon monoxide is decreased to substantially zero or a predetermined value or less on the basis of concentration ratio characteristics of the burner and the endothermic device by using the air-ratio adjusting device of the burner.

More specifically, it is a combustion method in which gas generated on combustion of fuel in a burner is brought into contact with an oxidation catalyst, thereby decreasing nitrogen oxides contained in the gas. The combustion method includes a combustion step in which hydrocarbon-containing fuel is burned in the burner, thereby generating gas free of hydrocarbons but containing oxygen, nitrogen oxides, and carbon monoxide, an endothermic step in which endothermic device are used to absorb heat from gas generated in the combustion step, a hazardous-substance decreasing step in which the gas is brought into contact with an oxidation catalyst after the endothermic step, oxidizing carbon monoxide contained in the gas by oxygen and reducing nitrogen oxides by carbon monoxide, and a concentration ratio adjusting step in which a concentration ratio K of oxygen, nitrogen oxides, and carbon monoxide in a gas on the primary side of the oxidation catalyst is adjusted to any one of the following Adjustment 0 to Adjustment 2 on the basis of the concentration ratio characteristics of the burner and the endothermic device by using the air-ratio adjusting device of the burner.

Adjustment 0: the concentration ratio K is adjusted to a predetermined reference concentration ratio K0 in which a concentration of nitrogen oxides and a concentration of carbon monoxide on the secondary side of the oxidation catalyst are decreased to substantially zero.

Adjustment 1: the concentration ratio K is adjusted to a first predetermined concentration ratio K1 in which the concentration of nitrogen oxides on the secondary side of the oxidation catalyst is decreased to substantially zero and the concentration of carbon monoxide on the secondary side of the oxidation catalyst is decreased to a predetermined value or less.

Adjustment 2: the concentration ratio K is adjusted to a second predetermined concentration ratio K2 in which the concentration of carbon monoxide on the secondary side of the oxidation catalyst is decreased to substantially zero and the concentration of nitrogen oxides on the secondary side of the oxidation catalyst is decreased to a predetermined value or less.

Then, the catalyst is characterized in that it decreases each of the concentration of nitrogen oxides and that of carbon monoxide on the secondary side of the catalyst to substantially zero when Adjustment 0 is made, decreases the concentration of nitrogen oxides on the secondary side of the catalyst to substantially zero and that of carbon monoxide on the secondary side of the catalyst to a predetermined value or less when Adjustment 1 is made. Further, the catalyst decreases the concentration of carbon monoxide on the secondary side of the oxidation catalyst to substantially zero and that of nitrogen oxides on the secondary side of the oxidation catalyst to a predetermined value or less when Adjustment 2 is made.

In Embodiment 2, the concentration ratio means a mutual relationship between the concentration of carbon monoxide, that of nitrogen oxides, and that of oxygen. A preferable predetermined reference concentration ratio K0 of Adjustment 0 is determined by the following formula (1), and preferably set in such a manner that it satisfies the following formula (2), the first predetermined concentration ratio K1 is made smaller than the predetermined reference concentration ratio, and the second predetermined concentration ratio K2 is made larger than the predetermined reference concentration ratio.

$$([NOx]+2[O_2])/[CO]=K \qquad (1)$$

$$1.0 \leq K=K0 \leq 2.0 \qquad (2)$$

where [CO], [NOx], and [O$_2$] represent the concentrations of carbon monoxide, nitrogen oxides and oxygen, respectively, and satisfying the condition of [O$_2$]>0.

The predetermined reference concentration ratio K0 is a concentration ratio of oxygen, nitrogen oxides, and carbon monoxide on the primary side of the oxidation catalyst in which the concentration of oxygen, that of nitrogen oxides, and that of carbon monoxide on the secondary side of the oxidation catalyst are each decreased to substantially zero. Formula (1) is to determine the predetermined reference concentration ratio K0, and formula (2) indicates conditions for decreasing the concentration of oxygen, that of nitrogen oxides, and that of carbon monoxide on the secondary side of the oxidation catalyst to substantially zero. Theoretically, each of these concentrations can be decreased to zero under the condition of K0=1.0. However, experimental results have confirmed that each of the concentrations can be decreased to substantially zero within a scope of formula (2) and an upper limit of the K0, 2.0, may be a value greater than 2.0, depending on characteristics of the catalyst.

When a concentration ratio K on the primary side of the oxidation catalyst is adjusted so that it is lower than the predetermined reference concentration ratio K0, in other words, K in formula (1) is given as the first predetermined concentration ratio K1, which is smaller than K0 (Adjustment 1), the concentration of oxygen and that of nitrogen oxides on the secondary side of the oxidation catalyst are decreased to substantially zero and the concentration of carbon monoxide is decreased to a value equal to or lower than a predetermined value. The predetermined value of the concentration of carbon monoxide is preferably set to be equal to or lower than an emission standard value (since this value is different depending on countries, it may be changed in each of the countries). Upon determination of the predetermined value, it is possible to determine experimentally the first predetermined concentration ratio K1. More specifically, such adjustment of the concentration ratio K that a value of the concentration ratio K is given as the first predetermined concentration ratio K1, which is smaller than K0, can be made by making smaller a ratio of the concentration of oxygen to that of carbon monoxide on the primary side of the oxidation catalyst than a ratio of the concentration of oxygen to that of carbon monoxide, which satisfies the predetermined reference concentration ratio K0.

Further, a concentration ratio K on the primary side of the oxidation catalyst is adjusted in such a manner that the concentration ratio K will be the second predetermined concentration ratio K2, which is greater than K0, (Adjustment 2), thereby the concentration of carbon monoxide on the secondary side of the oxidation catalyst is decreased to substantially zero and that of nitrogen oxides on the secondary side of the oxidation catalyst is decreased to a value equal to or lower than a predetermined value. In this instance, the concentration of oxygen on the secondary side of the oxidation catalyst will be a predetermined concentration. A predetermined value of the concentration of nitrogen oxides is different from the predetermined value of the concentration of carbon monoxide and preferably equal to or lower than an emission standard value determined in each country. Upon determination of the predetermined value, it is possible to determine experimentally the second concentration ratio K2. More specifically, such adjustment of the concentration ratio K to give the second predetermined concentration ratio K2 can be made by making greater the ratio of the concentration of oxygen to that of carbon monoxide on the primary side of the oxidation catalyst than a ratio of the concentration of oxygen to that of carbon monoxide, which satisfies the predetermined reference concentration ratio K0.

The present embodiment preferably has a concentration ratio constant-control step of keeping constant the concentration ratio K at each of the predetermined concentration ratios K0, K1 and K2.

In Embodiment 2 of the combustion method, first, in the combustion step, combustion is conducted in the burner to generate gas free of hydrocarbons but containing oxygen, nitrogen oxides, and carbon monoxide. Then, a concentration ratio K of oxygen, nitrogen oxides, and carbon monoxide in the gas on the primary side of the catalyst is adjusted to the predetermined reference concentration ratio K0, the first predetermined concentration ratio K1, or the second predetermined concentration ratio K2 in the concentration ratio adjusting step, according to any one of Adjustment 0, Adjustment 1, and Adjustment 2. Then, in the hazardous-substance decreasing step, the gas is in contact with the catalyst, by which carbon monoxide is oxidized by oxygen in the gas and nitrogen oxides are reduced by carbon monoxide. Where Adjustment 0 or Adjustment 1 is made, oxygen in the hazardous-substance decreasing step is to adjust the concentration of carbon monoxide, in other words, consuming and decreasing carbon monoxide, which is excessively available in reduction of nitrogen oxides to decrease the concentration to substantially zero. According to the hazardous-substance decreasing step after Adjustment 0 or Adjustment 1, the amount of emitted nitrogen oxides in the gas is decreased to substantially zero, and the amount of emitted carbon monoxide is decreased to substantially zero or a value equal to or lower than a predetermined value. Further, according to the hazardous-substance decreasing step after Adjustment 2, the amount of emitted carbon monoxide in the gas is decreased to substantially zero and the concentration of nitrogen oxides is also decreased to a value equal to or lower than a predetermined value. Still further, according to the concentration ratio constant-control step, a change is suppressed in each of the predetermined concentration ratios K0, K1, and K2, thus making it possible to secure the effects of decreasing amounts of emitted nitrogen oxides and carbon monoxide. In particular, in Adjustment 0, the concentration ratio constant-control step is important in decreasing amount of emitted nitrogen oxides to substantially zero.

A predetermined reference concentration ratio K0 of Adjustment 0 and a first predetermined concentration ratio K1 of Adjustment 1 can be collectively expressed by the following formula (3). In other words, when formula (3) is satisfied, the concentration of nitrogen oxides on the secondary side of the catalyst is decreased to substantially zero, and the concentration of carbon monoxide is decreased to substantially zero, otherwise the concentration of carbon monoxide is decreased. In order to decrease the concentration of carbon monoxide to a value equal to or lower than the predetermined value, the concentration ratio K on the primary side of the oxidation catalyst is adjusted so that the concentration ratio K will be a value smaller than K0, thereby obtaining the first predetermined concentration ratio K1.

$$([NOx]+2[O_2])/[CO] \leq 2.0 \qquad (3)$$

where [CO], [NOx], and [O$_2$] represent the concentrations of carbon monoxide, nitrogen oxides and oxygen, respectively, and satisfying the condition of [O$_2$]>0.

An explanation will be further made for actions of decreasing hazardous substances in the hazardous-substance decreasing step. The actions may be conducted in the following procedures. The oxidation catalyst undergoes a first reaction for oxidizing carbon monoxide and a second reaction for reducing nitrogen oxides by carbon monoxide as main reactions. Then, in reactions of the oxidation catalyst (catalyst reactions), the first reaction is predominant over the second reaction in the presence of oxygen. Thus, carbon monoxide is consumed by oxygen on the basis of the first reaction and adjusted for the concentration and nitrogen oxides are thereafter reduced by the second reaction. This is a simplified explanation. In reality, the first reaction is competitive with the second reaction. However, since the reaction of carbon monoxide with oxygen takes place apparently faster than the second reaction in the presence of oxygen, it is considered that carbon monoxide is oxidized at a first stage (first reaction) and nitrogen oxides are reduced (second reaction) at a second stage.

Briefly, in the oxidation catalyst, oxygen is consumed by the first reaction of $CO+1/2O_2 \rightarrow CO_2$, in the presence of oxygen, and remaining CO is used to reduce nitrogen oxides by the second reaction of $2CO+2NO \rightarrow N_2+2CO_2$, thereby decreasing the concentration of emitted nitrogen oxides.

In this case, [NOx] in formula (2) is a total of the concentration of nitric monoxide [NO] and that of nitric dioxide, [NO$_2$]. In the above explanation on the reaction formulae, NO is used in place of NOx to make a similar explanation, because nitrogen oxides generated at high temperatures are constituted mainly with NO, with only a few percentages taken up by NO$_2$. NO$_2$, if present, is considered to be reduced by CO in a similar manner as NO.

Where the concentration ratio K is 1.0, it is theoretically possible to decrease to zero the concentrations of oxygen, nitrogen oxides, and carbon monoxide emitted from the catalyst. However, carbon monoxide is experimentally found to be emitted in a slight amount. Then, a formula of ([NOx]+2 [O$_2$])/[CO]=1 has been theoretically derived from the first reaction and the second reaction, with the experimental results taken into account.

In this case, an explanation will be made for how to derive the formula of ([NOx]+2[O$_2$])/[CO]=1. Since the formula satisfies typically the predetermined reference concentration ratio K0, it is referred to as predetermined reference concentration satisfying formula.

It is known that the first reaction (I) takes place as a main reaction inside the catalyst.

$$CO+1/2O_2 \rightarrow CO_2 \quad (I)$$

Further, inside the catalyst in which a precious metal catalyst such as Pt is used, NO reduction reaction due to CO resulting from the second reaction (II) will proceed in oxygen-absent atmospheres.

$$CO+NO \rightarrow CO_2+1/2N_2 \quad (II)$$

Therefore, with attention given to the concentration of a substance contributing to the first reaction (I) and the second reaction (II), the above reference concentration satisfying formula has been derived by the inventors of the present application.

Specifically, when the concentration of CO, that of NO, and that of O$_2$ are given as [CO] ppm, [NO] ppm, and [O$_2$] ppm, respectively, the concentration of oxygen, which can be removed by CO on the basis of formula (I), is expressed by the following formula (III).

$$2[O_2]=[CO]a \quad (III)$$

Further, in order to have a reaction expressed by formula (II), CO is needed in an amount equal to that of NO, thus establishing a relationship expressed by the following formula (IV).

$$[CO]b=[NO] \quad (IV)$$

Where the reactions expressed by formulae (I) and (II) are allowed to occur continuously inside the catalyst, a concentration relationship expressed by the following formula (V) is needed, which can be obtained by combining formula (III) with formula (IV).

$$[CO]a+[CO]b=2[O_2]+[NO] \quad (V)$$

Since [CO]a+[CO]b are the same component, they can be expressed as [CO] in terms of the concentration of CO in gas on the secondary side of the catalyst.

Thus, the predetermined reference concentration ratio satisfying formula, that is, a relationship expressed by [CO]=2 [O$_2$]+[NO] can be obtained.

Where the concentration ratio K is smaller than 1.0, the concentration of carbon monoxide is available in excess in reducing the nitrogen oxides. Therefore, the concentration of emitted oxygen is decreased to zero and carbon monoxide remains in gas after passing through the catalyst.

Further, the concentration ratio K of 2.0, which exceeds 1.0, may be due to the following reasons, although the value has been obtained experimentally. Reactions taking place in the catalyst are not completely elucidated, and there may be possibilities that auxiliary reactions may take place, in addition to the main reactions of the first and the second reactions. One of the auxiliary reactions may be that in which steam reacts with carbon monoxide to produce hydrogen, which may result in a reduction of nitrogen oxides and oxygen.

The combustion step is conducted by allowing hydrocarbon-containing fuel to burn in the burner, thereby generating gas free of hydrocarbons but containing nitrogen oxides, carbon monoxide and oxygen. This is a burning conducted in an ordinary combustion apparatus such as a boiler and not involved in an abrupt cooling such as that occurring in an internal combustion engine, by which no hydrocarbons are contained in the exhaust gas. Then, the air ratio is preferably 1.1 or lower. Thereby, combustion is conducted at a low air ratio to save energy.

The burner is a combustion apparatus in which fuel and combustible air are continuously supplied to conduct continuous combustion, thus excluding an internal combustion engine. Since an internal combustion engine such as an automobile engine is that in which fuel and combustible air are supplied discontinuously to conduct combustion, unburned combustibles such as hydrocarbons and carbon monoxide are produced in a large amount and contained in the exhaust gas. The method of the present invention is, therefore, not applicable to the internal combustion engine.

Further, the burner is preferably a primary aerated-type premixed burner at which fuel gas is previously mixed and burned. In order to effectively conduct the first reaction and the second reaction in the catalyst, it is important to adjust the concentration ratio K, which is shown in formulae (2) and (3) on oxygen, nitrogen oxides, and carbon monoxide. A premixed burner is used as the burner, thereby making it possible to relatively easily obtain the predetermined reference concentration ratio K0 in a low air ratio region. However, oxygen, nitrogen oxides, and carbon monoxide in gas on the primary side of the catalyst are uniformly mixed and controlled so as to obtain the individual concentrations as the predetermined concentration ratios, thus making it possible to provide a partially premixed burner or a previously-mixed burner other than a premixed burner.

The endothermic step is a step in which heat is absorbed from gas generated in the combustion step by using endothermic device. The endothermic device is preferably a water tube group constituting a storage water heater body such as a boiler. The embodiment of the endothermic device includes a first aspect (corresponding to Patent Documents 1 to 4) in which a little combustion space is provided immediately close to the burner and a water tube group is arranged inside the combustion space and a second aspect having the combustion space between the burner and the water tube group. In the first aspect, burning reactions are in progress at a clearance between the water tube groups. The water tube group is a plurality of water tubes for heat exchanging with gas resulting from the burner. Such a constitution is also available that one water tube is meandered to form a plurality of water tubes as with water tubes used in a water heater.

The endothermic device is able to absorb heat from gas generated by the burner to utilize the heat, controlling the temperature of the gas to a temperature close to that of activating the oxidation catalyst, and also suppressing it to a temperature lower than that of preventing thermal deterioration. In other words, the endothermic device has a function of controlling the temperature of the gas at temperature at which the first and the second reactions take place effectively, thermal deterioration is suppressed, and the durability is taken into account. Further, the endothermic device is allowed to function as means for preventing the gas temperature from elevating to 900° C. or higher, thus stopping the oxidation of carbon monoxide, and keeping unchanged a concentration ratio in gas from the burner.

The concentration ratio adjusting step is a step in which the concentration ratio K of oxygen, nitrogen oxides, and carbon monoxide on the primary side of the catalyst is controlled so as to give the predetermined concentration ratio on the basis of the concentration ratio characteristics of the burner and the endothermic device by using the air-ratio adjusting device of the burner, thereby the concentration of nitrogen oxides on the secondary side of the catalyst is decreased to substantially zero or a value equal to or lower than a predetermined value and that of carbon monoxide on the secondary side of the catalyst is decreased to substantially zero or a value equal to or lower than a predetermined value. Then, the concentration ratio adjusting step is a step in which the concentration ratio K on the primary side of the oxidation catalyst is adjusted to the predetermined reference concentration ratio K0, the first predetermined concentration ratio K1, or the second predetermined concentration ratio K2, and this adjustment can be made by using the following first and second concentration ratio adjusting device. In the present invention, each of the adjusting devices is to adjust a concentration ratio according to the air-ratio adjusting device for adjusting an amount ratio of fuel to combustible air in the burner (to be described later).

The first concentration ratio adjusting device is to utilize the characteristics of the burner in adjusting the concentration ratio K and also utilize the characteristics of the endothermic device arranged between the burner and the oxidation catalyst to absorb heat from the gas, that is, utilizing the concentration ratio characteristics of the burner and the endothermic device. The concentration ratio characteristics are such characteristics to conduct combustion in the burner by allowing an air ratio to change, by which the concentration of carbon monoxide and that of nitrogen oxides are changed after complete or partial passage through the endothermic device. Further, the concentration ratio characteristics are in principle determined by the concentration ratio characteristics of the burner, and the endothermic device is typically provided with functions to partially change the concentration ratio characteristics of the burner or retaining the concentration ratio characteristics. Where the endothermic device is given as the first aspect, gas during burning reactions by the endothermic device is cooled to increase the concentration of carbon monoxide and also to suppress the concentration of nitrogen oxides. Where the endothermic device is given as the second aspect, the concentration ratio characteristics by the burner are typically retained, with most of the characteristics kept as they are.

Where the first concentration ratio adjusting device is used to adjust the concentration ratio K, no adjustment for concentration ratio is needed other than that by the burner or the endothermic device, thereby making an apparatus simple in constitution.

Further, the endothermic device is used to suppress temperatures of the gas, thereby providing the effects of improving the durability of the oxidation catalyst.

In the second concentration ratio adjusting device, the concentration ratio K is adjusted by utilizing the concentration ratio characteristics of the burner and endothermic device arranged between the burner and the oxidation catalyst to absorb heat from the gas and through the use of the auxiliary adjusting device arranged between the burner and the oxidation catalyst.

The auxiliary adjusting device is placed between the burner and the oxidation catalyst (including a part of the endothermic device) and provided with auxiliary functions to make the above adjustment by feeding carbon monoxide or adsorbing and removing oxygen, thereby increasing a concentration ratio of carbon monoxide to oxygen. The auxiliary adjusting device includes a CO generator and an auxiliary burner capable of adjusting an amount of oxygen or CO in exhaust gas.

Where the second concentration ratio adjusting device is used to adjust the concentration ratio, the concentration ratio is adjusted by using the auxiliary adjusting device, in addition to the concentration ratio characteristics of the burner and the endothermic device. Therefore, the burner and the endothermic device are not limited to a specially structured burner but applicable to a wider application.

The concentration ratio constant-control step is preferably conducted by air-ratio adjusting device in which an amount ratio of combustible air to fuel supplied to the burner is allowed to change. However, such a constitution is also available that the auxiliary adjusting device is given functions to control a concentration ratio constantly and adjustment is made by using concentration ratio constant-control device other than the air-ratio adjusting device or the auxiliary adjusting device. Where the air-ratio adjusting device is used, the concentration ratio K of the present invention can be controlled constantly to each of the predetermined concentration ratios K0, K1, and K2, in addition to air ratio control for keeping to a set value an original amount ratio of combustible air to fuel, thus eliminating a necessity of installing additional concentration ratio constant-control device to make an apparatus simple in constitution.

The catalyst is capable of reducing effectively the nitrogen oxides in a state that no hydrocarbons are contained in the gas. The catalyst is installed downstream from the endothermic device or on its way to the endothermic device and structured so as to hold a catalyst activating substance on a breathable matrix. The structure is not limited to a specific one. The matrix includes metals such as stainless steel and ceramics to which surface treatment is given so as to widen the area which is in contact with exhaust gas. In general, the catalyst activating substance includes platinum and may include precious metals such as Ag, Au, Rh, Ru, Pt, and Pd, a typical example of which is platinum or metal oxides depending on the practical use. Where the catalyst is installed on its way to the endothermic device, it is installed on a clearance between a plurality of endothermic devices. Such a structure is also available that the endothermic device such as water tubes is used as a matrix to hold a catalyst activating substance on the surface thereof.

The embodiment so far explained may be provided with a catalyst activating step of activating the catalyst. The catalyst activating step is preferably constituted so as to increase the concentration of carbon monoxide in the gas.

According to the above constitution, where conditions necessary for activating the catalyst are not available unlike at normal operation (for example, on high combustion) due to such reasons that a combustion apparatus is not at normal operation or the like (at the time of actuation or low combustion), there is increased the concentration of carbon monoxide in gas prior to being contacted with the catalyst, thus making it possible to effectively activate the catalyst. Therefore, combustion is conducted stably at a low air ratio to save energy, and the catalyst is also activated to provide a combustion method capable of realizing extremely low NOx emission and low CO emission at which a value of emitted NOx is below 5 ppm, even in a case where a difference is found in the combustion state or others.

Further, the catalyst activating step may be constituted so as to increase the temperature of the catalyst. According to this constitution, as described above, for example, where conditions necessary for activating the catalyst are not available compared with normal operation due to the combustion apparatus not being at a normal operation state or the like, the temperature of the catalyst is increased, thus making it possible to effectively activate the catalyst. Therefore, combustion is stably conducted at a low air ratio to save energy, and the catalyst is also activated to provide a combustion method capable of realizing extremely low NOx emission at which a value of emitted NOx is below 5 ppm and low CO emission even in a case where a difference is found in the combustion state or others.

(Embodiment 1 of Combustion Apparatus)

The present invention includes the following Embodiment 1 of a combustion apparatus. Embodiment 1 of the combustion apparatus includes a concentration ratio adjusting device of allowing carbon monoxide and oxygen to be contained in gas containing nitrogen oxides from a gas generation source, and adjusting the concentration ratio of nitrogen oxides, carbon monoxide, and oxygen in the gas to be a predetermined reference concentration ratio, and an oxidation catalyst that comes into contact with the gas to oxidize carbon monoxide by oxygen in a first reaction and reduce nitrogen oxides by carbon monoxide in a second reaction. The oxidation catalyst has characteristics in which the first reaction predominant over the second reaction, and the concentrations of nitrogen oxides and carbon monoxide on the secondary side are decreased to substantially zero when the concentration ratio on the primary side is set to be the reference concentration ratio. The combustion apparatus includes a sensor for detecting the concentration of oxygen on the secondary side of the oxidation catalyst, and the concentration ratio adjusting device controls the concentration ratio so that the detected oxygen concentration by the sensor becomes a set oxygen concentration substantially close to zero.

(Embodiment 2 of Combustion Apparatus)

Embodiment 1 of a combustion apparatus is applied to the following Embodiment 2 of a combustion apparatus. Even in Embodiment 2, in the same way as in Embodiment 1, the concentration of oxygen on the secondary side of the catalyst is detected by the sensor to control the predetermined reference concentration ratio, and the description thereof will be omitted. Embodiment 2 includes a burner for burning a hydrocarbon-containing fuel to generate gas free of hydrocarbon but containing oxygen, nitrogen oxides, and carbon monoxide, an endothermic device for absorbing heat from gas generated by the burner, an oxidation catalyst for oxidizing carbon monoxide contained in the gas after passage through the endothermic device by oxygen and reducing nitrogen oxides by carbon monoxide, a sensor for detecting an air ratio of the burner, and an air-ratio adjusting device for controlling the burner to a set air ratio based on a detected signal of the sensor. The burner and the endothermic device are configured so as to obtain a concentration ratio of oxygen, nitrogen oxides, and carbon monoxide on the primary side of the oxidation catalyst at which the concentration of nitrogen oxides on the secondary side of the oxidation catalyst is decreased to substantially zero, when the air ratio is adjusted to the set air ratio by the air-ratio adjusting device. In the embodiment and the following embodiments, the air-ratio adjusting device constitutes a part of the concentration ratio adjusting device of the present invention.

The above set air ratio is preferably controlled to 1.0. The air ratio can be controlled so as to be a predetermined concentration of oxygen on the primary side of the catalyst, which is capable of satisfying the set air ratio of 1.0 as a result of reactions on the catalyst.

In Embodiment 2 of the present invention, combustion is conducted in the burner, with the air ratio controlled by the air-ratio adjusting device so as to give the set air ratio. Gas generated on combustion is subjected to endothermic actions by the endothermic device. Thereafter, carbon monoxide is oxidized by the catalyst and nitrogen oxides are reduced. As a result, the amount of emitted nitrogen oxides in the gas is decreased to a value close to zero, or 5 ppm or lower. The amount of emitted carbon monoxide is also decreased.

According to Embodiment 2 of the present invention, the air ratio is controlled by the air-ratio adjusting device so as to give the set air ratio, thus making it possible to obtain a concentration ratio of oxygen, nitrogen oxides, and carbon monoxide on the primary side of the catalyst in which the concentration of nitrogen oxides on the secondary side of the catalyst is decreased to substantially zero.

In controlling a low air ratio, it is difficult to obtain a stable control of the air ratio. However, the air-ratio adjusting device is provided with electrical control device and/or mechanical control device for stably controlling the air ratio, thus making it possible to obtain stable control of the air ratio.

The concentration ratio on the primary side of the catalyst is preferably adjusted in such a manner that the concentration of carbon monoxide in the gas on the primary side of the catalyst is approximately equal to or above a value obtained by adding the concentration of carbon monoxide decreased inside the catalyst by oxidation of carbon monoxide (first reaction) to the concentration of carbon monoxide decreased inside the catalyst by reduction of nitrogen oxides by carbon monoxide (second reaction).

Adjustment of the concentration ratio by the burner and the endothermic device can be made by determining the characteristics of air ratio-NOx/CO (concentration ratio characteristics) on the basis of experimental data. The concentration ratio is adjusted, by which the concentration of carbon monoxide in the gas on the primary side of the catalyst is equal to or above a value obtained by adding the concentration of carbon monoxide decreased inside the catalyst by oxidation of carbon monoxide to the concentration of carbon monoxide decreased inside the catalyst by reduction of nitrogen oxides by carbon monoxide.

If the air ratio is controlled so as to set a substantial air ratio of 1.0 in the above concentration ratio, it is preferable with regard to saving energy. A formula showing a range of the concentration ratio can be expressed by formula (3).

Further, the concentration of oxygen on the primary side of the catalyst, $O_2$, is given as $0\% < O_2 \leq 1.00\%$, the air ratio is substantially 1.0 under the condition of satisfying formula (3). Therefore, low NOx and low CO are emitted substantially in a zero concentration to save energy, making it possible to provide a low-pollution and energy-saving combustion apparatus.

The air-ratio adjusting device includes flow rate adjusting device, a motor for driving the flow rate adjusting device and a controller for controlling the motor. The flow rate adjusting device is means for changing either or both of an amount of combustible air and an amount of fuel in the burner to change a ratio of air to fuel, thereby adjusting the air ratio in the burner. An adjuster of the amount of combustible air is preferably a damper (including the meaning of a valve). As the damper, a rotational type in which a valve body rotating at the center of a rotating shaft is used to change an aperture of a flow channel or a slide type which slides on a cross-section opening of a flow channel to change an aperture of the flow channel can be used.

Where the flow rate adjusting device changes an amount of combustible air, the flow rate adjusting device is preferably installed on an air flow channel between a blower and fuel supply device. It may be also installed on a suction opening of the blower such as a suction opening of the blower.

The motor is preferably means for driving the flow rate adjusting device and shall be a motor capable of controlling an aperture extent of the flow rate adjusting device depending on a driving amount and also adjusting a driving amount per unit time. The motor partially constitutes "mechanical control device" for attaining a stable control of the air ratio. "Capable of controlling an aperture extent depending on a driving amount" means that an aperture of the flow rate adjusting valve can be controlled so as to halt at a specific position by determining the driving amount. Further, "capable of adjusting a driving amount per unit time" means that position control can be adjusted for responsiveness.

The motor is preferably a stepping motor (also referred to as step motor) and also includes a gear motor (also referred to as geared motor) and a servo motor. Where the stepping motor is used, the driving amount is decided by driving pulse, and an aperture position of the flow rate adjusting device is subjected to opening and closing movement only by an extent depending on the number of driving pulses from a reference aperture position to give any object, by which a halt position can be controlled. Further, where the gear motor or the servo motor is used, the driving amount is determined by opening/closing driving time, therefore an aperture position of the flow rate adjusting device is subjected to opening and closing movement only by an extent depending on the opening/closing driving time from a reference aperture position to give any object, by which a halt position is controlled.

Such an oxygen densitometer is favorably used as the above sensor that expresses an excess oxygen concentration in an oxygen excess region and expresses an insufficient oxygen concentration necessary for burning unburned gas such as carbon monoxide at an air ratio m=1.0 in a fuel excess region as a negative value. Further, the sensor may be that in which an oxygen concentration sensor may be combined with a carbon monoxide concentration sensor to obtain an approximate air ratio.

The above-mentioned sensor is preferably installed on the secondary side of the catalyst but shall not be limited thereto. Where an exhaust heat recovery system is installed on the primary side of the catalyst or the downstream side of the catalyst, the sensor may be installed on the downstream side.

In the air-ratio adjusting device, a driving amount of the motor is feed back controlled depending on an input value detected by the sensor on the basis of a previously-stored air ratio control program, and the air ratio is controlled to a set air ratio of 1 (constant control of the concentration ratio K) in such a manner that the concentration of carbon monoxide in the gas on the primary side of the catalyst is approximately equal to or above a value obtained by adding the concentration of carbon monoxide decreased inside the catalyst by the oxidation to the concentration of carbon monoxide decreased inside the catalyst by the reduction or formula (3) is satisfied.

The air ratio control program is preferably constituted with a first control zone for changing a driving amount of the motor per unit time (which can be expressed by time per driving unit) depending on a difference between the detected air ratio and the set air ratio and a second control zone for giving the driving amount per unit time as a fixed set value outside the first control zone, thereby controlling a driving amount of the motor. The above control constitutes the electrical control device by which the detected air ratio is kept within a set range on the basis of the set air ratio. In addition, the air ratio control program is not limited to the above-mentioned control but may include various types of PID control. A control amount at the first control zone can be controlled by referring to a formula of the product of a difference between the detected air ratio and the set air ratio with a set gain. Therefore, the detected air ratio can be smoothly controlled to the set air ratio, and such control that is less frequent in overshoot or hunting can also be attained effectively.

Adjustment of a concentration ratio by the burner and the endothermic device includes any adjustment made by elements constituting a gas duct from the burner to the catalyst other than the endothermic device and elements included in the gas duct.

Further, the mechanical control device may be constituted in such a manner that an air supply duct for combustible air is composed of a main duct and an auxiliary duct parallel therewith. In this case, an air flow rate is roughly adjusted by operating a valve body installed on the main duct, and the air flow rate is finely adjusted by operating a valve body installed on the auxiliary duct. The mechanical control device may be also constituted in such a manner that a fuel supply duct is composed of a main duct and an auxiliary duct parallel therewith. In this case, an air flow rate is roughly adjusted by operating a valve body installed on the main duct, and the flow rate is finely adjusted by operating a valve body installed on the auxiliary duct.

The flow rate adjusting device of the air-ratio adjusting device may be that in which a motor mounted on a blower is controlled by an inverter. The inverter may be made with a known constitution. Also where the inverter is used, control may be provided depending on the air ratio control program used in controlling a damper.

(Embodiment 3 of Combustion Apparatus)

The present invention includes Embodiment 3 of the following combustion apparatus. The combustion apparatus is provided with a burner allowing hydrocarbon-containing fuel to burn, thereby generating gas free of hydrocarbons but containing oxygen, nitrogen oxides, and carbon monoxide, endothermic device for absorbing heat from gas generated by the burner, a catalyst for oxidizing carbon monoxide contained in the gas after passing through the endothermic device and reducing nitrogen oxides by carbon monoxide, and air-ratio adjusting device for adjusting the air ratio of the burner. The burner and the endothermic device have the characteristics of air ratio-NOx/CO on the primary side of the catalyst (primary characteristics) related to the gas containing oxygen, nitrogen oxides, and carbon monoxide on the primary side of the catalyst obtained on adjustment of the air ratio in the vicinity of 1.0 by using the air-ratio adjusting device. The catalyst is constituted so as to have characteristics of air ratio-NOx/CO on the secondary side of the catalyst (secondary characteristics) obtained by allowing gas having the characteristics of air ratio-NOx/CO on the primary side to be in contact with the catalyst. Further, the air-ratio adjusting device controls an air ratio of the burner at a set air ratio in a NOx/CO decreasing region having the characteristics of air ratio-NOx/CO on the secondary side. The primary characteristics are concentration ratio characteristics of the burner and the endothermic device of the present invention, including air ratio-NOx characteristics and air ratio-CO characteristics. Further, the secondary characteristics are characteristics of the catalyst (catalyst characteristics), including air ratio-NOx characteristics and air ratio-CO characteristics.

(First aspect of Embodiment 3)

The above set air ratio is, as one aspect, set to a value at which the concentration of nitrogen oxides in the secondary characteristics (concentration of emitted NOx) is decreased to substantially zero. In this instance, an air ratio of the burner is controlled so as to substantially have a value of 1.0, by which the concentration of nitrogen oxides can be decreased to substantially zero. This control is preferably conducted by referring to an air ratio on the secondary side of the catalyst, but also conducted by referring to the concentration of oxygen ($O_2$ concentration) on the primary side so that the $O_2$ concentration on the primary side of the catalyst, which is able to substantially satisfy a set air ratio of 1.0, is given as a predetermined concentration as a result of reactions by the catalyst.

In the first aspect, gas generated on combustion by the burner is converted into gas, which is subjected to endothermic actions by endothermic device to contain oxygen, nitrogen oxides, and carbon monoxide at predetermined concentration ratios. When an air ratio of the burner is allowed to change in a low air ratio region, primary characteristics are provided, which are concentration ratio characteristics of the burner and the endothermic device, and the secondary characteristics are provided, which are characteristics of the catalyst. Then, in a region where the concentration of NOx of the secondary characteristics is lower than the concentration of NOx of the primary characteristics and the concentration of carbon monoxide (CO concentration) is lower than the concentration of CO of the primary characteristics, in other words, in a NOx/CO decreasing region, the set air ratio is set, thereby the amount of emitted nitrogen oxides is decreased and that of emitted carbon monoxide is also decreased by oxidation and reduction of the catalyst. The air ratio is set in the NOx/CO decreasing region, thus making it possible to realize Adjustment 0, Adjustment 1, and Adjustment 2.

(Second Aspect of Embodiment 3)

In the second aspect, the set air ratio is set to a value at which the concentration of NOx of the secondary characteristics is substantially in excess of zero and also is lower than the concentration of NOx of the primary characteristics. The value is realized by being set to an air ratio in the NOx/CO decreasing region of the secondary characteristics at which the set air ratio is substantially in excess of 1.0. Adjustment 2 is realized by the second aspect.

In the second aspect, since the set air ratio is in excess of 1.0, oxygen is present on the secondary side of the catalyst. This is due to the fact that since an oxidation reaction is predominant over a reduction reaction inside the catalyst, the concentration of emitted NOx is decreased to a value lower than the concentration of NOx of the primary characteristics but not decreased to zero, thereby NOx is present on the secondary side of the catalyst. Further, the concentration of emitted CO is decreased to substantially zero due to oxidation of the catalyst.

The primary characteristics are different in curvature and concentration value depending on the type of burner and the endothermic device of a combustion apparatus. Typical CO characteristics of the primary characteristics tend to increase in CO concentration with a decrease in air ratio. In particular, CO characteristics of the primary characteristics show an abrupt increase in CO concentration in the vicinity of an air ratio of 1.0.

(Third Aspect of Embodiment 3)

The above-mentioned first and second aspects can be expressed by the following third aspect. The third aspect provides a combustion apparatus including a burner allowing hydrocarbon-containing fuel to burn, thereby generating gas free of hydrocarbons but containing oxygen, nitrogen oxides, and carbon monoxide, endothermic device for absorbing heat from gas generated by the burner, an oxidation catalyst to be in contact with the gas after passing through the endothermic device for oxidizing carbon monoxide by oxygen and reducing nitrogen oxides by carbon monoxide, and air-ratio adjusting device for adjusting the amount ratio of combustible air to fuel supplied to the burner. The oxidation catalyst is characterized in that when a concentration ratio of oxygen, nitrogen oxides, and carbon monoxide in the gas is in a NOx non-decreasing region, the concentration of carbon monoxide is decreased but that of nitrogen oxides is not decreased, when the concentration ratio is in a NOx decreasing region, the concentration of carbon monoxide and that of nitrogen oxides are decreased. The air-ratio adjusting device adjusts the amount ratio of combustible air to fuel supplied to the burner in such a manner that the concentration ratio is in the NOx decreasing region.

The NOx decreasing region in the third aspect corresponds to the NOx/CO decreasing region in Embodiments 1 and 2, which are described above. In the third aspect, the adjustment is made preferably in such a manner that the concentration of nitrogen oxides on the secondary side of the oxidation catalyst is decreased to substantially zero. Further, the adjustment is preferably made in such a manner that the concentration of oxygen on the secondary side of the oxidation catalyst is decreased to substantially zero. In the catalyst, carbon monoxide is decreased through oxidation, whereas nitrogen oxides are decreased through reduction by carbon monoxide.

Further, in the third aspect, a concentration ratio is adjusted by the burner and the endothermic device preferably in such a manner that the concentration of generated hazardous substances is suppressed to a value equal to or lower than a set concentration. In this case, the hazardous substances (also referred to as pollutants) are nitrogen oxides or nitrogen oxides and carbon monoxide. The set concentration can be defined as 300 ppm, for example, where the hazardous substances are nitrogen oxides. In other words, the concentration of hazardous substances generated on adjustment of the concentration ratio is suppressed to a value equal to or lower than the set concentration, thus making it possible to decrease the amount of treatment by the oxidation catalyst or the amount of the catalyst.

(Embodiment 4 of Combustion Apparatus)

Further, the present invention includes Embodiment 4 of the following combustion apparatus. Embodiment 4 provides a combustion apparatus including a burner allowing hydrocarbon-containing fuel to burn, thereby generating gas free of hydrocarbons but containing oxygen, nitrogen oxides, and carbon monoxide, endothermic device for absorbing heat from gas generated by the burner, a catalyst, which is brought into contact with gas containing oxygen, nitrogen oxides, and carbon monoxide after passing through the endothermic device, thereby conducting a first reaction for oxidizing carbon monoxide by oxygen contained in the gas and a second reaction for reducing nitrogen oxides by carbon monoxide in the gas as main reactions, and air-ratio adjusting device for adjusting a ratio of combustible air to fuel in the burner. In the catalyst, a concentration ratio of oxygen, nitrogen oxides, and carbon monoxide in gas on the primary side of the catalyst, which decreases the concentration of nitrogen oxides and that of carbon monoxide on the secondary side to substantially zero, is used as a predetermined reference concentration ratio. When the concentration ratio is set to be the predetermined reference concentration ratio, the concentration of nitrogen oxides and that of carbon monoxide on the secondary side of the catalyst are decreased to substantially zero. Further, when the concentration of oxygen on the primary side is made higher than the concentration of the reference oxygen corresponding to the predetermined reference concentration ratio, oxygen is detected in a concentration depending on a difference between the concentration of oxygen on the primary side and a reference oxygen concentration on the secondary side of the catalyst, and when the concentration of carbon monoxide on the secondary side of the catalyst is decreased to substantially zero, the concentration of nitrogen oxides is decreased, and the concentration of oxygen on the primary side is decreased to a greater extent than the reference oxygen concentration, carbon monoxide is detected in a concentration depending on a difference between the concentration of oxygen on the primary side and the reference oxygen concentration on the secondary side of the catalyst, the concentration of nitrogen oxides on the secondary side of the catalyst is decreased to substantially zero, and the concentration of carbon monoxide is decreased. The air-ratio adjusting device adjusts an amount ratio of combustible air to fuel in the burner on the basis of the concentration of oxygen on the secondary side of the catalyst, by which the concentration of oxygen on the primary side of the catalyst is adjusted with respect to the reference oxygen concentration to decrease the concentration of nitrogen oxides and that of carbon monoxide on the secondary side of the catalyst by the use of characteristics of the catalyst.

Embodiment 3, which has been described previously, expresses functions of the combustion apparatus on the basis of the primary characteristics and the secondary characteristics of the burner and the endothermic device with respect to an air ratio obtained by the concentration of oxygen and/or that of carbon monoxide on the secondary side of the catalyst. In contrast, Embodiment 4 expresses functions of the combustion apparatus based on the primary characteristics of the burner and the endothermic device with respect to the concentration of oxygen on the primary side of the catalyst and characteristics of the catalyst.

The catalyst characteristics will be explained as the following characteristics. In other words, as shown in a pattern diagram of FIG. 7, a characteristic line L of the concentration ratio is provided on the primary side of the catalyst (secondary side [NOx]=0, [CO]=0 line). When the concentration ratio K on the primary side of the catalyst is positioned on the line L, the concentration of nitrogen oxides and that of carbon monoxide on the secondary side of the catalyst are decreased to substantially zero. The line L is theoretically that in which the predetermined concentration ratio K in formula (3) corresponds to 1.0 (in formula (2), K0=1.0). However, as described previously, it has been confirmed experimentally that the concentration of nitrogen oxides and that of carbon monoxide on the secondary side of the catalyst can be decreased to substantially zero in a range where the concentration ratio K is up to 2.0 in excess of 1.0. Therefore, the characteristic line L is not limited to the line given in FIG. 7.

Then, a concentration ratio K of oxygen, nitrogen oxides, and carbon monoxide at a point at which a line M of the primary characteristics of the burner and the endothermic device intersects with the characteristic line L is temporarily referred to as specific predetermined reference concentration ratio K0X (hereinafter referred to as specific reference concentration ratio). When the concentration ratio K on the primary side of the catalyst is adjusted to the specific reference concentration ratio K0X (Adjustment 0), the concentration of nitrogen oxides and that of carbon monoxide on the secondary side of the catalyst are decreased to substantially zero. Then, when the concentration of oxygen on the primary side is made higher than a reference oxygen concentration SK corresponding to the specific reference concentration ratio K0X, in other words, the air-ratio adjusting device is used to increase the concentration of oxygen on the primary side (Adjustment 2), oxygen is detected in a concentration depending on a difference of the concentration of oxygen on the primary side and a reference oxygen concentration on the secondary side of the catalyst, the concentration of nitrogen oxides on the secondary side of the catalyst is decreased to a greater extent than the concentration of nitrogen oxides on the primary side, and also the concentration of carbon monoxide on the secondary side is decreased to substantially zero. Further, when the concentration of oxygen on the primary side is decreased to a greater extent than the specific reference concentration ratio K0X (Adjustment 1), carbon monoxide is detected in a concentration depending on a difference between the concentration of oxygen on the primary side and the reference oxygen concentration on the secondary side of the catalyst, the concentration of nitrogen oxides on the secondary side of the catalyst is decreased to substantially zero, and that of carbon monoxide on the secondary side is also decreased.

The characteristics of the catalyst as well as the primary characteristics of the burner and the endothermic device are utilized to control the concentration of oxygen and/or that of carbon monoxide to zero on the secondary side of the catalyst. In other words, an air ratio is controlled to 1.0, thus making it possible to have an easy control over the concentration of emitted NOx and that of emitted CO to substantially zero. Specifically, the concentration of oxygen and/or that of carbon monoxide on the secondary side of the catalyst are controlled to conduct combustion at an air ratio of 1.0, thereby attaining not only energy savings but also practically zero emissions of NOx and CO, which can be regarded as extremely low pollution.

Further, the concentration of oxygen and/or that of carbon monoxide on the secondary side of the catalyst are controlled to a value close to zero, by which the concentration of emitted NOx may not be decreased to substantially zero but can be decreased to a value close to zero.

Embodiment 1

Next, an explanation will be made by referring to the drawings for an embodiment in which the combustion apparatus of the present invention is applied to a steam boiler: FIG. 1 is a longitudinal sectional view for explaining a steam boiler of Embodiment 1; FIG. 2 is a sectional view taken along line II to II in FIG. 1; FIG. 3 is a drawing showing a constitution of major parts when an oxidation catalyst in FIG. 2 is viewed from a direction in which exhaust gas flows; FIG. 4 is a drawing showing the characteristics of air ratio-NOx/CO in Embodiment 1; FIG. 5 is a partial sectional view for explaining a damper position adjusting device of Embodiment 1, which is in operation; FIG. 6 is a partial sectional view for explaining the damper position adjusting device in operation; FIG. 7 is a pattern diagram for explaining the characteristics of a burner and an endothermic device and the characteristics of a catalyst in Embodiment 1; FIG. 8 is a drawing for explaining the output characteristics of a sensor of Embodiment 1; FIG. 9 is a drawing for explaining motor control characteristics in Embodiment 1; and FIG. 10 is a drawing for explaining the NOx and CO decreasing characteristics of Embodiment 1.

First, an explanation will be made for the steam boiler of Embodiment 1. The steam boiler is provided with as major parts, a burner 1, a storage water heater body 3 including a heat transfer tube (water tube) group 2 as endothermic device for absorbing the heat of gas generated from the burner 1, an oxidation catalyst (hereinafter sometimes simply referred to as "catalyst") 4 through which gas containing each of oxygen, nitrogen oxides, and carbon monoxide at the predetermined concentration ratios after passing through the group of heat transfer tubes 2 in contact therewith, thus oxidizing carbon monoxide and also reducing nitrogen oxides, fuel supply device 5 for supplying fuel gas to the burner 1, combustible air supply device 6 for supplying combustible air to the burner 1 to premix fuel with the combustible air, a sensor 7 for detecting the concentration of oxygen downstream from the catalyst 4, and a controller 8 as a boiler controller for inputting signals such as those from the sensor 7 or others to control the fuel supply device 5, the combustible air supply device 6, and others.

The burner 1 is a complete premix-type burner having a flat combustion face (face of ejecting premixed air). The burner 1 is similar in constitution to the burner described in Patent Document 1.

The storage water heater body 3 is provided with an upper header 9 and a lower header 10 to arrange a plurality of inner water tubes 11, 11 . . . , which constitute the water tube group 2 between the headers. Then, as shown in FIG. 2, a pair of water tube walls 14, 14 constituted by connecting outer water tubes 12, 12 . . . by using connection members 13, 13 . . . are provided on both ends of the storage water heater body 3 in a longitudinal direction, thereby forming a first gas duct 15 through which gas from the burner 1 passes substantially linearly between these water tube walls 14, 14, the upper header 9, and the lower header 10. The burner 1 is installed on one end of the first gas duct 15, and a second gas duct (smoke duct) 17 through which exhaust gas passes is connected to the other end thereof, which is an exhaust gas outlet 16. The burner 1 and the storage water heater body 3 used in Embodiment 1 are known.

The second gas duct 17 includes a horizontal part 18 and a perpendicular part 19, and the catalyst 4 is loaded at the horizontal part 18. A feed-water preheater 20, as an exhaust heat recovery system, is attached to the perpendicular part 19 so as to be positioned downstream from the catalyst 4, and the sensor 7 is placed between the catalyst 4 and the feed-water preheater 20.

The burner 1 and constituents from the burner 1 including the water tube group 2 to the catalyst 4 (in particular, the burner 1 and the water tube group 2 are major parts) are provided with functions to adjust the concentration ratio K in gas on the primary side of the catalyst 4 to the predetermined concentration ratios K0 and K1. In other words, those constituents are structured so that there are provided the characteristics of air ratio-NOx/CO as shown in FIG. 4 when adjustment is made to a set air ratio by air-ratio adjusting device 28 to be described later, which constitute the concentration ratio adjusting device of the present invention. The characteristics of air ratio-NOx/CO are characteristics of air ratio-NOx/CO on the primary side of the catalyst 4, which are obtained when the air-ratio adjusting device 28 is controlled to conduct combustion at a varied air ratio (hereinafter, referred to as primary characteristics). Then, the catalyst 4 has characteristics of air ratio-NOx/CO on the secondary side of the catalyst 4, which are obtained by allowing the gas having the primary characteristics to be in contact with the catalyst 4 (hereinafter, referred to as secondary characteristics). The primary characteristics are the concentration ratio characteristics of constituents from the burner 1 to the catalyst 4, whereas the secondary characteristics are characteristics of the catalyst 4. The primary characteristics are to decrease the concentration of NOx and that of carbon monoxide on the secondary side of the catalyst 4 to substantially zero when the air ratio is adjusted to 1.0. In this instance, the predetermined reference concentration ratio K0 in gas on the primary side of the catalyst 4 is given as a specific reference concentration ratio K0X (refer to FIG. 7).

FIG. 4 is a pattern diagram in which the low air ratio region Z2 given in FIG. 18 is elongated, although the vertical axis and the lateral axis are differently scaled. In FIG. 4, a first line (characteristic line) E indicates the concentration of CO on the primary side of the catalyst 4, and a second line F indicates the concentration of NOx on the primary side. Further, a third line J indicates the concentration of CO on the secondary side of the catalyst 4, having such characteristics that the concentration of CO is decreased to substantially zero at an air ratio 1.0 or more and the concentration is abruptly increased as the air ratio is lower than 1.0. Still further, a fourth line U indicates the concentration of NOx on the secondary side of the catalyst 4, having such characteristics that the concentration of NOx is decreased to substantially zero in a predetermined region having the air ratio of 1.0 or lower, and the concentration is increased substantially from zero when the air ratio is in excess of 1.0, and soon equal to the concentration on the primary side of the catalyst 4. A region equal to or lower than an air ratio at which the concentration of NOx on the secondary side of the catalyst 4 is equal to the concentration on the primary side is referred to as NOx/CO decreasing region. A lower limit of the NOx/CO decreasing region is given as an air ratio at which the concentration of CO on the secondary side of the catalyst 4 is 300 ppm (CO emission standards in Japan). Characteristics of air ratio-NOx/CO of the low air ratio region are new characteristics, which have not yet been subjected to research.

The catalyst 4 is provided with functions of oxidizing carbon monoxide contained in the gas free of hydrocarbons after passing through the water tube group 2 (first reaction) and also reducing nitrogen oxides (second reaction). In Embodiment 1, used is a catalyst in which a catalyst activating substance is platinum. As already having been explained in the section of "Best Mode for carrying out the Invention,"

when theoretical consideration is given on the basis of experimental results, there may be a first reaction in which the gas satisfying formula (3) of the concentration ratio is in contact with the catalyst activating substance of the catalyst 4 to oxidize mainly carbon monoxide and a second reaction in which nitrogen oxides are reduced by carbon monoxide. Whether the first reaction proceeds or not will be determined depending on the concentration of oxygen. In the catalyst 4, it is considered that the first reaction is predominant over the second reaction.

The catalyst 4 will be specifically explained by referring to a catalyst constituted in FIG. 3 and formed in such procedures that many fine irregularities are formed on the respective surfaces of a flat plate 21 and a corrugated plate 22, both of which are made of stainless steel, as the matrix, thereby holding a catalyst activating substance (not illustrated) on the surfaces. Then, the flat plate 21 having a predetermined width is placed on the corrugated plate 22, which are then wound helically and formed into a roll shape. A side plate 23 is used to enclose and fix the thus shaped substance to form the catalyst 4. Platinum is used as the catalyst activating substance. In addition, FIG. 3 shows the flat plate 21 and the corrugated plate 22 only partially.

The catalyst 4 is active in oxidation in a low temperature region and placed at the horizontal part 18, which is on its way to the second gas duct 17, that is, at a position where the temperature of exhaust gas is approximately in a range of 150° C. to 350° C. Then, the catalyst 4 is removably attached to the second gas duct 17 so as to be exchanged when deteriorated in performance.

The fuel supply device 5 is constituted so as to include a fuel gas supply tube 24 and a flow rate adjusting valve 25 installed on the fuel gas supply tube 24 to adjust a fuel flow rate. The flow rate adjusting valve 25 is provided with functions of controlling fuel supply at a high combustion flow rate and a low combustion flow rate.

The combustible air supply device 6 is constituted so as to include a blower 26, an air supply duct 27 for supplying combustible air from the blower 26 to the burner 1, and air-ratio adjusting device 28 for adjusting an air ratio of the burner 1 by adjusting the amount of combustible air flowing through the air supply duct 27. The fuel gas supply tube 24 is connected inside the air supply duct 27 so as to eject fuel gas.

The air-ratio adjusting device 28 is constituted so as to include a damper 29 as flow rate adjusting device for adjusting an aperture (cross-sectional area of the flow channel) of the air supply duct 27, a damper position adjusting device 30 for adjusting an aperture position of the damper 29, and the controller 8 for controlling the operation of the damper position adjusting device 30.

The damper position adjusting device 30 is, as shown in FIG. 5, provided with a driving shaft 32 removably connected to a rotating shaft 31 of the damper 29. The driving shaft 32 can be rotated by a motor 34 via a reduction gear 33. The motor 34 includes any motor freely adjustable for rotation position and stop position. In the present embodiment, a stepping motor (pulse motor) is used.

The driving shaft 32 is connected to the rotating shaft 31 of the damper 29 via a coupling 35, by which it can be rotated with the rotating shaft substantially coaxially in an integral manner. The coupling 35 is formed in a stepped cylindrical shape, the central part of which is provided with a minor diameter hole 36 and a major diameter hole 37, which have penetrated axially. The driving shaft 32 is inserted into the minor diameter hole 36, and the driving shaft 32 is integrally fixed to the coupling 35 by a fitting screw 38. The rotating shaft 31 of the damper 29 can be inserted into the major diameter hole 37, and the rotating shaft 31 can be integrally rotated via a key 39 together with the coupling 35. Therefore, key grooves 40, 41 are formed on the rotating shaft 31 and the major diameter hole 37 of the coupling 35, respectively.

The above-mentioned coupling 35 is retained in an external case 43 of the damper position adjusting device 30 so as to rotate freely in a state that one end thereof is inserted into the driving shaft 32, with the other end inserted via a bearing 42. The external case 43 is constituted in such a manner that the reduction gear 33 and the motor 34 are retained on one end thereof and the coupling 35 and an abnormal rotation detecting device 44 are contained therein hermetically on the other end thereof in a state that the key groove 41-equipped major diameter hole 37 of the coupling 35 is exposed.

The abnormal rotation detecting device 44 is provided with a plate to be detected 45 and a detector 46. The plate to be detected 45 is extended radially outwardly and fixed to a stepped portion at the center of the coupling 35 in an axial direction. The plate to be detected 45 is installed so as to be coaxial with the coupling 35 and the driving shaft 32. A slit forming region 48 having many slits 47, 47 . . . , equally spaced in a peripheral direction is installed partially at an outer periphery of the plate to be detected 45. In the present embodiment, the slit forming region 48 is installed only in a quarter of a circular arc (90 degrees). Each of the slits 47 formed at the slit forming region 48 is identical in shape and size. In the present embodiment, the slits 47 is formed by peripherally punching narrow and long rectangular grooves along the plate to be detected 45 in the radial direction at equal intervals.

The detector 46 for detecting the slit 47 is fixed to the external case 43. The detector 46 is composed of a transmission-type photo interrupter and installed in such a manner that an outer periphery of the plate to be detected 45 is placed between a light emitting device 49 and a light receiving device 50. The plate to be detected 45 is placed between the light emitting device 49 and the light receiving device 50 of the detector 46, thereby presence or absence of light reception from the light emitting device 49 by the light receiving device 50 is switched by whether or not the slit 47 on the plate to be detected 45 is arranged at a position corresponding to the detector 46 (position corresponding to a light path from the light emitting device 49 to the light receiving device 50). Thereby, it is possible to detect an aperture position of the damper 29.

The damper position adjusting device 30 is positioned so that the damper 29 keeps the air supply duct 27 fully opened in a state that a slit 51 at the clockwise end of the slit forming region 48 shown in FIG. 6 is arranged at a position corresponding to the detector 46 and attached to the rotating shaft 31 of the damper 29.

Then, the slit forming region 48 is formed only at a portion corresponding to a quarter of the plate to be detected 45, therefore, in a state that the slit 51 at the clockwise end of the slit forming region 48 is placed at a position corresponding to the detector 46, the damper 29 keeps the air supply duct 27 fully closed as described above. On the other hand, in a state that a slit 52 at the counter-clockwise end of the slit forming region 48 is arranged at a position corresponding to the detector 46, the damper 29 keeps the air supply duct 27 fully opened.

The damper position adjusting device 30 is constituted so that the motor 34 and the detector 46 are connected to the controller 8, and being able to control the rotation of the motor 34, while monitoring an abnormal rotation of the damper 29. More specifically, in order to control the motor 34, the damper position adjusting device 30 is provided with a circuit for preparing control signals including driving pulse to the motor 34 and able to output the thus prepared control signal to the motor 34. Thereby, the motor 34 is arbitrarily controlled for the rotation angle, depending on normal rotation or reverse rotation and driving amount, that is, the number of driving pulses. Further, the motor 34 is constituted so that it is possible to control the rotation speed by changing the interval of the driving pulse (feeding velocity).

In controlling an actual opening and closing of the damper 29, the controller 8 at first operates to detect an original point so that a fully closed position of the damper 29 can be given as the original point. First, in FIG. 5, the plate to be detected 45 is rotated in a counter-clockwise direction. On the assumption that the detector 46 is at present arranged inside the slit forming region 48 of the plate to be detected 45, the detector 46 detects the slit 47 regularly in accordance with the rotation of the plate to be detected 45. Therefore, the detected pulse is output to the controller 8 as a detection signal. Then, the plate to be detected 45 is rotated until the detector 46 is placed outside the slit forming region 48, thereby no pulse is detected. If no pulse is detected within a predetermined time, the controller 8 recognizes that the detector 46 is outside the slit forming region 48, switching the rotating direction to a reverse direction. In other words, in the present embodiment, the original point is defined as a position at which the plate to be detected 45 is rotated reversely in a clockwise direction to detect the first pulse (slit 51 at the clockwise end). Confirmation of the original point by the clockwise rotation is made at a lower speed than the counter-clockwise rotation before the rotating direction is switched.

Since the thus detected original point corresponds to a fully closed position of the damper 29, the controller 8 outputs a driving signal to the motor 34 on the basis of this state, thus making it possible to control the opening and closing of the damper 29. If the controller 8 drives the motor 34 to open or close the damper 29, a detection signal of the slit 47 is obtained as a pulse from the detector 46 accordingly. Therefore, the controller 8 is able to monitor an abnormal rotation of the damper 29 by comparing a detection signal from the detector 46 with a control signal to the motor 34. More specifically, a control signal composed of driving pulse to the motor 34 is compared with a detection signal composed of detection pulse of the slit 47 by the detector 46, thereby monitoring the presence or absence of abnormal rotation.

For example, where no detection pulse is detected from the detector 46 despite the fact that a driving pulse has been sent to the motor 34, the controller 8 determines it to be an abnormal rotation. In this instance, the detection pulse from the detector 46 is usually different in frequency from driving pulse to the motor 34. Therefore, the controller 8 gives a control, with the difference taken into account. For example, the controller 8 gives a control so that the abnormal rotation is determined only in a case where no pulse of detection signal is detected at all even after the elapse of a predetermined pulse of a driving signal. The controller 8 performs a notification operation of the abnormal rotation and halts the combustion upon determination of the abnormal rotation. In contrast, the abnormal rotation can also be detected in a case where any pulse is detected by the detector 46, despite the fact that no driving pulse has been sent to the motor 34.

The controller 8 is constituted so as to control the motor 34 by referring to a previously stored air ratio control program based on signals detected by the sensor 7 in such a manner that an air ratio of the burner 1 will be a set air ratio (first control condition) and also a concentration ratio K of the gas on the primary side of the catalyst 4 satisfies the following formula (3) at this set air ratio (second control condition).

$$([NOx]+2[O_2])/[CO] \leq 2.0 \quad (3)$$

where [CO], [NOx], and [O$_2$] represent the concentrations of carbon monoxide, nitrogen oxides, and oxygen, respectively, and satisfying the condition of [O$_2$]>0.

In Embodiment 1, it is the first control condition that gives a direct control. Therefore, the embodiment is constituted so that the first control condition is satisfied, by which the second control condition is automatically satisfied. This will be explained hereinafter by referring to FIG. 4 and FIG. 7.

The characteristics of air ratio-NOx/CO given in FIG. 4 are expressed based on the primary characteristics of constituents including the burner 1 and the water tube group 2 as well as the secondary characteristics of the catalyst 4. In addition, FIG. 7 expresses them based on the primary characteristics of the constituents with respect to the concentration of oxygen on the primary side of the catalyst 4 and the characteristics of the catalyst 4.

As shown in FIG. 7, the characteristics of the catalyst 4 are expressed by a fifth line L ([NOx] on the secondary side=0, [CO]=0 line) related to the predetermined reference concentration ratio K0 on the primary side of the catalyst 4. The fifth line L is a line in which the concentration of nitrogen oxides and that of carbon monoxide on the secondary side of the catalyst 4 are decreased to substantially zero when the concentration ratio K on the primary side of the catalyst 4 is positioned (placed) on the line, specifically, a line, which satisfies the predetermined reference concentration ratio K0. The fifth line L corresponds to a case where the predetermined concentration ratio of formula (3) is 1. In other words, the fifth line L is a line satisfying the following formula (3A).

$$[NOx]+2[O_2]=[CO] \quad (3A)$$

In this instance, as shown in FIG. 10, [NOx] is approximately from 1/30 to 1/50 of [CO] in concentration. Thus, in FIG. 7, NOx concentration characteristics with respect to the concentration of oxygen are omitted, and [NOx] of formula (3A) can be negligible. Where the concentration of oxygen on the primary side is X1 on the fifth line L, the concentration of carbon monoxide on the primary side Y1 will be Y1=2X1+[NOx]. In addition, since confirmation has been made for the predetermined reference concentration ratio K0, which decreases the concentration of nitrogen oxides and that of carbon monoxide on the secondary side of the catalyst 4 to substantially zero in a range of the concentration ratio K exceeding 1.0 up to 2.0, the fifth line L is not limited to the line L shown in the drawing but may include any line satisfying formula (2).

Then, a predetermined reference concentration ratio K0 of oxygen, nitrogen oxides, and carbon monoxide at a point at which a sixth line M indicating the primary characteristic curve of the burner 1 and the water tube group 2 intersects with the fifth line L is the specific reference concentration ratio K0X. Where the concentration ratio K on the primary side is given as the specific reference concentration ratio K0X, the catalyst 4 has such characteristics that the concentration of nitrogen oxides and that of carbon monoxide on the secondary side of the catalyst 4 are decreased to substantially zero. The adjustment to the reference concentration ratio K0X corresponds to Adjustment 0 of the present invention.

Then, the catalyst 4 has such characteristics that when the concentration of oxygen on the primary side is made higher than the reference oxygen concentration SK corresponding to the specific reference concentration ratio K0X, oxygen is detected on the secondary side of the catalyst 4 in a concentration depending on a difference between the concentration of oxygen on the primary side and the reference oxygen concentration, the concentration of carbon monoxide on the secondary side of the catalyst 4 is decreased to substantially zero, and the concentration of nitrogen oxides on the secondary side of the catalyst 4 is decreased to a greater extent than the concentration of nitrogen oxides on the primary side by reduction reaction. A region characterized in that oxygen is detected on the secondary side of the catalyst 4 and the concentration thereof is decreased to a greater extent than the concentration of nitrogen oxides on the primary side is referred to as secondary NOx leakage region R1. The secondary NOx leakage region R1 is a region, which realizes Adjustment 2 of the present invention, and an air ratio of the burner 1 is in excess of 1.0.

The catalyst 4 also has such characteristics that: when the concentration of oxygen on the primary side is lower than the reference oxygen concentration SK, carbon monoxide is detected on the secondary side of the catalyst 4 in a concentration depending on a difference between the concentration of oxygen on the primary side and the reference oxygen concentrating SK; and the concentration of nitrogen oxides on the secondary side of the catalyst 4 is decreased to substantially zero in a predetermined range. A region characterized in that carbon monoxide is detected on the secondary side of the catalyst 4 and the concentration of nitrogen oxides is decreased to substantially zero is referred to as secondary CO leakage region R2. The secondary CO leakage region R2 is a region, which realizes Adjustment 1 of the present invention, and an air ratio of the burner 1 is less than 1.0. The air ratio of the burner 1 is set in a range free of hydrocarbons but containing oxygen on the primary side of the catalyst 4, where it is set to less than 1.0. A region, which combines the secondary NOx leakage region R1 with the secondary CO leakage region R2, is referred to as NOx/CO decreasing region R3.

The above-mentioned characteristics of the catalyst 4 shown in FIG. 7 are in agreement with the characteristics of air ratio-NOx/CO shown in FIG. 4. As apparent from FIG. 7, when the concentration of oxygen and/or that of the carbon monoxide on the secondary side of the catalyst 4 are detected and the air-ratio adjusting device 28 is controlled in such a manner that the concentration of oxygen and/or that of carbon monoxide are decreased to zero, the concentration ratio K on the primary side of the catalyst 4 is controlled to the specific reference concentration ratio K0X, and the concentration of nitrogen oxides and that of carbon monoxide on the secondary side of the catalyst 4 can be decreased to substantially zero. Thus, the first control condition is satisfied, by which the second control condition is also to be satisfied.

Failure to satisfy the first control condition would result in the generation of unburned combustibles such as hydrocarbons. In this case, energy loss would be caused, and the catalyst 4 would be unable to attain an effective decrease in NOx.

The second control condition is necessary in decreasing the concentration of emitted nitrogen oxides to substantially zero. It has been found by experiments and theoretical consideration that in order to decrease the concentration of nitrogen oxides and that of carbon monoxide on the secondary side of the catalyst 4 to zero, a concentration ratio K, which gives ([NOx]+2[$O_2$])/[CO] may be approximately 1.0 by referring to the first reaction and the second reaction. It has been, however, confirmed that the concentration of emitted nitrogen oxides can be decreased to substantially zero even at the concentration ratio K of 1 or higher, that is, from 1.0 to 2.0.

Used as the sensor 7 is a zirconia type air-fuel ratio sensor which has a resolution of emitted oxygen concentration of 50 ppm and which is excellent in responsiveness, that is, having a response time of 2 sec or less. As shown in FIG. 8, output characteristics of the sensor 7 are those in which an output E is given as an output related to the concentration of oxygen on the positive side and as an output related to the concentration of carbon monoxide or others on the negative side. In other words, an air ratio m is calculated by referring to the concentration of oxygen (oxygen excess region) and the concentration of carbon monoxide (fuel excess region) or the like to be determined, thus obtaining an output of electric current or voltage corresponding to the air ratio m. In FIG. 8, Q1 indicates an oxygen concentration detecting zone, and Q2 indicates a carbon monoxide concentration detecting zone.

Then, the air ratio control program gives control on the basis of signals output by the sensor 7 in such a manner that an air ratio m of the burner will be the reference set air ratio m0. More specifically, it is constituted as follows. That is, as shown in FIG. 9, the program includes such control procedures that a first control zone C1 at which a feeding velocity V of the motor 34 (driving amount per unit time) is changed depending on a difference between an output value E from the sensor 7 and a set value corresponding to the reference set air ratio m0, and second control zones C2A and C2B at which the feeding velocity V is divided into a first set value V1 and a second set value V2 outside the first control zone C1 are provided to control a driving amount of the motor 34. In FIG. 9, P1 indicates a damper opened region, and P2 indicates a damper closed region.

A range of the first control zone C1 is set by the concentration of oxygen N1 (for example, 100 ppm) and the concentration of carbon monoxide or others N2 (for example, 50 ppm), and controlled so that an air ratio will be a set air ratio m0, which is substantially 1, (corresponding to the reference oxygen concentration SK).

A feeding velocity V in the first control zone C1 can be calculated by the following formula (4). The feeding velocity V is a driving amount per unit time. A rotating angle in 1 step of the motor 34 of Embodiment 1 is 0.075 degrees, which corresponds to change in approximately 30 ppm in terms of $O_2$.

$$V = K \times \Delta X \quad (4)$$

where K represents a gain, and $\Delta X$ represents a difference between the output value of the sensor 7 and the set value.

Next, an explanation will be given for motions of the thus constituted steam boiler. First, combustible air (ambient air) supplied from the blower 26 is premixed with fuel gas supplied from the fuel gas supply tube 24 inside the air supply duct 27. The thus premixed air is ejected from the burner 1 to the first gas duct 15 inside the storage water heater body 3. The premixed air is ignited by ignition device (not illustrated) to burn. This burning is conducted at a low air ratio close to 1.0.

The gas generated in accordance with this burning is in contact with an upstream water tube group 2 and cooled. Thereafter, it is treated endothermically through heat exchange with a downstream water tube group 2 to yield gas at approximately 150° C. to 350° C. The gas free of hydrocarbons but containing oxygen, nitrogen oxides, and carbon monoxide is treated by the catalyst 4 and emitted as exhaust gas into the atmosphere from the second gas duct 17, after the concentration of nitrogen oxides and that of carbon monoxide are decreased to substantially zero.

Next, an explanation will be made for an air ratio controlled by the air-ratio adjusting device 28. The boiler used in the present embodiment is operated by switching high combustion to low combustion. Therefore, the damper 29 is positioned by selecting a high combustion airflow position or a low combustion airflow position.

The damper 29 is adjusted for position by the damper position adjusting device 30 on the basis of instructions from the controller 8. In other words, the controller 8 inputs a signal for selecting the high combustion or the low combustion and an output value corresponding to an air ratio detected by the sensor 7 to output a signal for driving the motor 34, thereby adjusting an aperture position of the damper 29. An aperture position set for the damper 29, which is used as a set value corresponding to each set air ratio m0 on high combustion or low combustion, is stored at the controller 8 as an initial value for each pulse number from an original point.

First, an explanation will be given for control on high combustion. The controller 8 determines whether the present aperture position of the damper 29 is on the opening side with respect to the set aperture position (the side to be controlled in a closing direction) or on the closing side (the side to be controlled in an opening direction) and also calculates the driving pulse number of the motor 34. It also determines whether the output value belongs to the first control zone C1 or the second control zones C2A and C2B in FIG. 9.

Where the output value belongs to the second control zone C2A, the controller 8 drives the motor 34 at the first set feeding velocity V2 and also at a calculated driving pulse to close the damper 29 at a high velocity. Where it belongs to the second control zone C2B, the controller 8 drives the motor 34 at the second set feeding velocity V1 and also at a calculated driving pulse to open the damper 29 at a high velocity. Therefore, where the output value is relatively distant from a set value corresponding to the reference set air ratio m0, the controller 8 controls an output value corresponding to an air ratio detected at a high velocity so as to come closer to a set value corresponding to the reference set air ratio m0, thus making it possible to give air ratio control excellent in responsiveness.

Further, where the output value belongs to the first control zone C1, the controller 8 calculates a feeding velocity of the motor 34 based on formula (4) after determination of a rotational direction, and drives the motor 34 based on the thus calculated feeding velocity and the calculated driving pulse. The control at the first control zone C1 is made at a higher feeding velocity as the output value is further distant from a set value corresponding to the reference set air ratio m0. Due to the above-mentioned control, it is possible to smoothly bring the value closer to a set value corresponding to a target reference set air ratio m0. Further, a stepping motor capable of securing the control of a rotational position is used and a feeding velocity is controlled so as to slow down as an output value corresponding to the detected air ratio comes closer to a set value corresponding to the reference set air ratio m0, thus making it possible to suppress overshooting and hunting of the air ratio in the vicinity of a set value corresponding to the reference set air ratio m0.

The air ratio is controlled as described above, by which an air ratio of the burner 1 will be a low air ratio close to 1.0 and the concentration ratio of gas on the primary side of the catalyst 4 is controlled so as to change to a lesser extent, thus stably satisfying formula (2). As a result, the concentration of nitrogen oxides on the secondary side of the catalyst 4 can be decreased to substantially zero and that of carbon monoxide on the secondary side of the catalyst 4 can also be decreased to substantially zero. Where a set air ratio m0 is made less than 1.0, the concentration of nitrogen oxides on the secondary side can be decreased to substantially zero and that of carbon monoxide on the secondary side can also be decreased to a value equal to or lower than a predetermined value in a range of practical values.

(Experiment 1)

An explanation will be given for the result of an experiment conducted under the following conditions, that is, a storage water heater body 3 having a capacity of evaporation per unit time of 800 kg (storage water heater body with the production type of SQ-800 manufactured by the applicant) was assembled into a premixed burner 1 to conduct combustion at 45.2 m$^3$N/h, and a catalyst with a volume of 10 L and an inner diameter of 360 mm was prepared in which Pt was held as a catalyst activating substance at 2.0 g/L. Where the reference set air ratio m0 was given as 1, the concentration of carbon monoxide, that of nitrogen oxides, and that of oxygen on the primary side through the catalyst 4 (before passage through the catalyst 4) were adjusted to 2,295 ppm, 94 ppm, and 1,655 ppm, respectively, in terms of an average value for 10 minutes, and those on the secondary side through the catalyst 4 (after passage through the catalyst 4) were adjusted to less than 13 ppm, 0.3 ppm, and 100 ppm, respectively, in terms of an average value for 10 minutes. In this instance, the concentration of oxygen on the secondary side of the catalyst 4, 100 ppm, was a detection limit of oxygen concentration. Further, temperatures of gas before and after the catalyst 4 were approximately 302° C. and 327° C., respectively. In Experiment 1 as well as Experiments 2 and 3 as described below, the catalyst 4 was placed slightly upstream from the feed-water preheater 20, and measurement instruments were placed before and after the catalyst 4. The respective concentrations and temperatures of gas after passage through the catalyst 4 were measured by using an instrument (PG-250) manufactured by Horiba Ltd., and the respective concentrations before passage through the catalyst 4 were measured by using an instrument (COPA-2000) manufactured by Horiba Ltd. As a matter of course, hardly any change may be found in the measurement concentration where the catalyst 4 is arranged in the position shown in FIG. 1.

(Experiment 2)

FIG. 10 shows values at each concentration ratio K at the concentration of carbon monoxide, that of nitrogen oxides, and that of oxygen obtained in a case where the same burner 1 and the storage water heater body 3 as those of the Experiment 1 were used to conduct combustion at the same rate as that of Experiment 1, and a catalyst with a volume of 10 L and an inner diameter of 360 mm was prepared in which Pd was held as a catalyst activating substance at 2.0 g/L. In this instance, the concentration of oxygen after passage through the catalyst was measured by the same oxygen concentration sensor as that used in Experiment 1 and indicated as 100 ppm, even when the concentration was actually less than 100 ppm. Temperatures of gas before and after the catalyst 4 were in the ranges of approximately 323° C. to 325° C. and approximately 344° C. to 346° C., respectively.

According to Embodiment 1, damper position adjusting device (air-ratio adjusting device) 30 for adjusting the ratio of combustible air to fuel is used to control the air ratio to 1.0, thus making it possible to adjust the concentration ratio of oxygen, nitrogen oxides, and carbon monoxide on the primary side of the catalyst 4 to the specific reference concentration ratio K0X (Adjustment 0) and also decrease the concentration of emitted NOx and that of emitted CO to substantially zero. Therefore, as compared with technologies for decreasing NOx by addition of water/steam and those for decreasing NOx by use of a denitration agent, the present invention is able to decrease NOx and CO in a simple constitution in which air-ratio adjusting device and a catalyst are used.

Further, since the air ratio is set to substantially 1.0, an energy-saving operation can be performed. Incidentally, an ordinary boiler operated at oxygen concentration of 4% (air ratio of approximately 1.235) is compared with that operated at an oxygen concentration of 0% (air ratio of approximately 1.0) to find that the boiler efficiency is increased approximately by 1 to 2%. Nowadays, when measures are required for combating global warming, an increase in boiler efficiency can make a great contribution to industries.

Still further, the sensor 7 is installed on the secondary side of the catalyst 4 to control an air ratio, thus making it possible to obtain a stable control, as compared with a case where the sensor is installed on the primary side of the catalyst 4 to control the air ratio. The air ratio is also controlled at a resolution of oxygen concentration of 100 ppm or lower, thus making it possible to obtain air ratio control responsively and stably in a region great in the amount of CO and high in the CO increasing rate in air ratio-CO characteristics.

Embodiment 2

Another Embodiment 2 of the present invention will be explained by referring to FIG. 11 and FIG. 12. In Embodiment 2, a sensor 7 for detecting the concentration of oxygen is installed not on the secondary side of the catalyst 4 but on the primary side. The sensor 7 is used exclusively as a sensor for detecting the concentration of oxygen. Then, FIG. 12 shows control characteristics of the motor 34 on the basis of the sensor 7. Hereinafter, an explanation will be made only for parts different from those of Embodiment 1, with an explanation omitted for common parts.

In Embodiment 2, an air ratio is controlled indirectly by detecting the concentration of oxygen on the primary side of the catalyst 4 by using the sensor 7 in such a manner that a reference set air ratio m0 is set to 1.0 (the concentration of oxygen on the secondary side of the catalyst 4 is decreased to zero). It is now known on the basis of various experiment results that where the concentration of oxygen $O_2$ on the primary side of the catalyst 4 is controlled to a value of 0%<$O_2$≦1.00%, the formula (2) is satisfied and the concentration of oxygen on the secondary side of the catalyst 4 is decreased to substantially zero. In other words, it is known that the air ratio can be set to substantially 1.

As shown in FIG. 12, the air ratio control program of Embodiment 2 includes control procedures in which a first control zone C1 for changing based on a value E detected by the sensor 7 (oxygen concentration signal) a feeding velocity V of the motor 34 (driving amount per unit time) depending on a difference between the thus detected value and the set oxygen concentration value and second control zones C2A and C2B for dividing the feeding velocity V into a first set value and a second set value, respectively, outside the first control zone C1 are provided to control a driving amount of the motor 34.

A range in which the first control zone C1 is set will be controlled so as to fall within a range set by oxygen concentration N1 and oxygen concentration N2. A feeding velocity V at the first control zone C1 will be calculated by referring to formula (4) similar to Embodiment 1.

Embodiment 3

As shown in FIG. 13, Embodiment 3 is an example in which the set air ratio is set to such a value that the concentration of NOx of the secondary characteristics is substantially in excess of zero and lower than the concentration of NOx of the primary characteristics. This value is an air ratio of secondary NOx leakage region R1 of the secondary characteristics at which the set air ratio is substantially in excess of 1.0. Adjustment of concentration ratio K in Embodiment 3 is Adjustment 2.

The first control zone C1 in Embodiment 3 is that in which a center of the control range (target air ratio) is an air ratio of 1.005 ($O_2$ concentration: approximately 1,000 ppm), the left end is a value in a region substantially lower than an air ratio of 1.0, and the right end in FIG. 13 is an air ratio of 1.01 ($O_2$ concentration: approximately 2,000 ppm). When an explanation is given by referring to FIG. 7, the air ratio is to be controlled in the secondary NOx leakage region (a region at which Adjustment 2 is realized) R1 where the concentration of oxygen on the primary side of the catalyst 4 is higher than the reference oxygen concentration SK.

(Experiment 3)

In Embodiment 3, where experiments were conducted under the same conditions as those of Experiment 1 (excluding the set air ratio), the concentration of CO, that of NOx, and that of $O_2$ on the primary side of the catalyst 4 (before passage through the catalyst 4) were adjusted to 1,878 ppm, 78 ppm, and 3,192 ppm, respectively, in terms of an average value for 10 minutes, and those on the secondary side through the catalyst 4 (after passage through the catalyst 4) were adjusted to 0 ppm, 42 ppm, and 1,413 ppm, respectively, in terms of an average value for 10 minutes.

As apparent from Experiment 3, air ratio control in Embodiment 3 is able to decrease the concentration of emitted NOx to a value lower than the concentration of NOx of the primary characteristics due to reduction action of the catalyst 4 and also decrease the concentration of emitted C0 to zero.

In Embodiment 3, the first control zone can be freely set in a range of the secondary NOx leakage region R1. NOx can be decreased to a greater extent and energy is saved more effectively, as the first control zone C1 is brought closer to an air ratio of 1. However, since the concentration of CO to be treated is high (in some cases, indicating a steep concentration gradient), there is an easy leakage of CO, which makes the control more difficult to require a greater amount of catalyst. Therefore, the first control zone is set to the right side in FIG. 13 so as to be distant away from an air ratio of 1, thus making it possible to obtain an easy control and decrease the amount of the catalyst 4.

More specifically, the left end of the first control zone C1 is not set to an air ratio of 1.0 or lower in Embodiment 3 (FIG. 13) but can be set to an air ratio of 1.0. Further, the left end of the first control zone C1 in FIG. 13 can be set to a value exceeding the air ratio of 1.0.

Embodiment 4

In Embodiment 4, by referring to FIG. 15, the air ratio control device 28 includes a blower motor 52 for driving the blower 26 and an inverter 53 for controlling a revolution speed of the motor 52. Embodiment 4 is constituted in such a manner that air ratio control and concentration ratio constant control are obtained not by using the damper 29 but by using the inverter 53. The control of the blower motor 52 by the controller 8 can be obtained by suppressing the overshooting and hunting given in FIG. 9 covering Embodiment 1. The damper 29 controls air flow on high combustion and on low combustion by lowering the aperture on ignition and increasing the aperture during stable combustion after ignition. This air flow control can be obtained by using the inverter 53. The present invention shall not be limited thereto but may be constituted so that the air flow control on ignition and the like is obtained either by the damper 29 or the inverter 53. In Embodiment 4, other constitutions are similar to those of Embodiment 1, an explanation of which will be omitted here.

Embodiment 5

Next, an explanation will be given for Embodiment 5 in which a carbon monoxide control step of controlling the concentration of carbon monoxide in the gas is conducted in the concentration ratio adjusting step of Embodiment 1 by referring to FIG. 15 to FIG. 17. Embodiment 5 is in principle similar to Embodiment 1 but different in that a supplementary fuel supplying portion 60 for ejecting fuel gas is installed, whenever necessary, upstream from the burner 1. The supplementary fuel supplying portion 60 is provided with functions as supplementary adjusting device for adjusting the concentration ratio K supplementarily, and constituted so as to effect a partially diffused combustion by the burner 1 on ejection of fuel gas. Hereinafter, the same letters or numerals are given to common parts, an explanation of which will be omitted, with an explanation made mainly for different points.

With reference to FIG. 15 and FIG. 16, the supplementary fuel supplying portion 60 is provided with functions to eject fuel gas appropriately, thereby affecting a partially diffused combustion by the burner 1, if there is a necessity for adjusting the concentration of carbon monoxide in gas.

With reference to FIG. 17, the line L1 indicated by the "dotted line" is a line corresponding to the Line L in FIG. 7, or an optimal adjustment starting line of CO and $O_2$ (hereinafter, also simply referred to as "optimal adjustment starting line"). In the line L1, a value of the right side of formula (3) is 2.0, whereas in the line L, a value of the right side of formula (3) is 1.0. NOx and CO can be more effectively decreased to an extremely small extent by bringing a balance between carbon monoxide (CO) and oxygen ($O_2$) to the vicinity of a line formed in a region on the left side on the optimal adjustment starting line L1 in FIG. 17. In addition, the optimal adjustment starting line L1 shown in FIG. 17 is a line formed by "CO=(NOx/2)+2$O_2$." In FIG. 17, the optimal adjustment starting line L1 is shown as a straight line on which an original point is given as a starting point. However, as apparent from formula (3A), a value of the intercept on the Y axis is expressed by "NOx," which is, however, not illustrated in FIG. 17.

Now, the burner 1, which constitutes the combustion apparatus of Embodiment 5, is assumed to have combustion characteristics such as those indicated, for example, by a line MA ("prior-improvement" line) of a "single dotted and dashed line" in FIG. 17. If the burner 1 is used to effect combustion in the vicinity of the optimal adjustment starting line L1 where it has the combustion characteristics indicated by the "prior-improvement" line MA, there is a great increase in a concentration of carbon monoxide (CO), with an air ratio ($O_2$) only slightly decreased. It is, therefore, not easy to attain extremely low NOx emission and low CO emission.

Therefore, in Embodiment 5, where the combustion characteristics as described above ("prior-improvement" line MA) are found, fuel gas is ejected from the supplementary fuel supplying portion 60 as carbon monoxide control device, thereby the burner 1 is used to affect a partially diffused combustion. In other words, a partially diffused combustion is affected by the burner 10 (premixed burner) to increase the concentration of carbon monoxide, thereby improving CO characteristics. The line MB ("post-improvement" line) as indicated by the "solid line" in FIG. 17 shows the combustion characteristics obtained when the supplementary fuel supplying portion 60 is allowed to function with respect to the burner 1 having the combustion characteristics of the "prior-improvement" line MA.

As described so far, in Embodiment 5, the supplementary fuel supplying portion 60 is allowed to function, thus making it possible to control the combustion characteristics. As shown in FIG. 17, fuel characteristics are adjusted from the "prior-improvement" line MA to the "post-improvement" line MB, thereby making it possible to continue a stable combustion at a low air ratio even on combustion by the burner in the vicinity of the optimal adjustment starting line L1 (or a region left to the optimal adjustment starting line). In other words, the combustion characteristics of a "post-improvement" line MB will not cause the value of carbon monoxide (CO) to change greatly even if there is a change in air ratio ($O_2$) (for example, a slight decrease in air ratio) during operation in the vicinity of the optimal adjustment starting line L1 (or a region left to the optimal adjustment starting line). Therefore, according to Embodiment 5, the concentration of carbon monoxide in a low $O_2$ region is controlled to effect a stable combustion at a low air ratio, thus making it possible to easily attain energy saving and extremely low NOx emission such as NOx emitted at a value below 5 ppm and low CO emission.

Further, in Embodiment 5, gas is supplied from the supplementary fuel supplying portion 60 (a partially diffused combustion is effected by the burner 1) according to necessity (for example, depending on individual differences of burners (combustion characteristics)), thus adjusting the concentration of carbon monoxide in gas to an appropriate level.

In Embodiment 5, an explanation has been made for a case where the supplementary fuel supplying portion 60 is installed as carbon monoxide control device upstream from the burner 1 for increasing the concentration of carbon monoxide. The present invention shall not be limited to this constitution but may be applied to any other constitution as long as the concentration of carbon monoxide in gas can be appropriately increased. Therefore, such a constitution may be provided that a distance between the surface of the burner 1 and a water tube is adjusted to control the concentration of carbon monoxide. Such a constitution may also be provided that a supplementary fuel supplying portion or an air supplying portion is installed inside a storage water heater body to control the concentration of carbon monoxide.

Embodiment 6

Next, an explanation will be made for Embodiment 6 in which a catalyst activating step of activating the catalyst 4 is conducted in Embodiment 1. Constituents of an apparatus in Embodiment 6 are similar to those of Embodiment 5. Embodiment 6 will be explained by referring to FIG. 15 and FIG. 16. In Embodiment 6, a supplementary fuel supplying portion 60 is installed as with Embodiment 5, and the supplementary fuel supplying portion functions as catalyst activating device.

Then, in Embodiment 6, the supplementary fuel supplying portion 60 is constituted so as to eject fuel gas appropriately when gas before being in contact with the catalyst 4 (exhaust gas) is low in temperature, for example, on actuation of the boiler 1 and on low combustion.

In general, combustion apparatuses such as boilers are subjected to three position control or the like including low combustion and high combustion. In other words, operation is conducted in a plurality of combustion amounts inside a single storage water heater body (inside a combustion region), if necessary. Therefore, where operation is conducted inside the single storage water heater body in a different combustion amount, in most cases, in order to decrease NOx on high combustion, the catalyst 4 or the like is designed to be installed. However, in this constitution, it is difficult to decrease NOx on operation other than high combustion (for example, on low combustion or actuation) in a similar manner on high combustion. This is due to the fact that gas (exhaust gas) is lower in temperature on low combustion or actuation than on high combustion. In other words, the catalyst 4 will not function properly to result in a failure in attaining a similar decrease of NOx on high combustion.

Therefore, in Embodiment 6, the supplementary fuel supplying portion 60 is installed on the primary side of the burner 1 (upstream side) to elevate the temperature of gas on actuation or low combustion. The supplementary fuel supplying portion 60 supplies gas (for a partially diffused combustion) to increase the concentration of carbon monoxide in gas, thereby elevating the gas temperature after reactions, when such determination is made that gas should be increased in temperature based on the temperature of the catalyst 4 or others.

Further, where the catalyst 4 is kept at an appropriate temperature even on actuation or low combustion, no gas is supplied from the supplementary fuel supplying portion 60.

In the boiler (combustion apparatus) of Embodiment 6, even on actuation or low combustion when gas (exhaust gas) is to be decreased in temperature and insufficient in activating the catalyst 4, the supplementary fuel supplying portion 60 (catalyst activating device) is provided to increase the concentration of carbon monoxide in gas, thus making it possible to elevate the gas temperature. Therefore, according to Embodiment 6, it is possible not only to affect a stable combustion at a low air ratio for saving energy but also to activate the catalyst 4, thereby obtaining a combustion method for actually attaining extremely low NOx emission and such as emitted NOx lower than 5 ppm, and low CO emission, despite a difference in the combustion state.

Moreover, where the platinum-containing catalyst 4 is used, a temperature necessary for oxidizing (clarifying) CO (CO activating temperature in the catalyst 4) is approximately 100° C., whereas that necessary for reducing (clarifying) NOx (NOx activating temperature in the catalyst 4) is approximately 150° C. Therefore, where exhaust gas is above 150° C. or where exhaust gas is low in temperature (lower than 150° C.) but CO is abundantly present (the catalyst 4 is increased in temperature to 150° C. or higher by (the reaction heat of) CO), oxidation of CO and reduction of NOx can be properly conducted by the catalyst 4. However, where exhaust gas is low in temperature (lower than 150° C.) and CO is scarcely present (the catalyst 4 is not increased in temperature to 150° C. or higher even by (the reaction heat of) CO), it is impossible to purify NOx completely. If the temperature is assumed to be lower than 100° C., it is likewise impossible to purify CO completely. Therefore, Embodiment 6 is constituted so that the supplementary fuel supplying portion 60 is actuated to introduce CO, thus elevating the temperature of the catalyst 4 to 150° C. or higher by use of the reaction heat of CO, where exhaust gas is low in temperature (lower than 150° C.) and CO is scarcely present (the catalyst 4 is not increased in temperature to 150° C. or higher even by (the reaction heat of) CO).

In Embodiment 6, an explanation has been made for a case where the supplementary fuel supplying portion 60 is installed as catalyst activating device upstream from the burner 1 for increasing the concentration of carbon monoxide. The present invention shall not be limited to the case and any constitution may be used as long as it is possible to increase the concentration of carbon monoxide in gas before being in contact with a catalyst portion. Therefore, such a constitution may be provided that a supplementary fuel supplying portion or an air supplying portion (not illustrated) is installed inside a storage water heater body.

Catalyst heating device for elevating the temperature of a catalyst may also be installed in the vicinity of the catalyst 4 to activate the catalyst 4.

Further, activation of the catalyst 4 is considered to improve the performance of the catalyst 4 in a different perspective. Therefore, in the present invention, there may be provided such a constitution that a plurality of the catalysts are installed in multiple stages as catalyst activating device, from such a perspective (improved performance of catalyst).

The present invention shall not be limited to Embodiments 1 to 5. Since the characteristics of air ratio-NOx/CO shown in FIG. 4 and FIG. 13, for example, are different in curve and concentration value, depending on a structure of the burner 1 or the storage water heater body 3 used in the combustion apparatus, different characteristics may be used. Further, in Embodiments 1 and 2, a set air ratio is 1.0 or more. The set air ratio may be a value lower than an air ratio of 1.0 as long as combustion characteristics are not impaired or no hydrocarbons are contained.

Further, in Embodiment 2, an $O_2$ concentration sensor is used as the sensor 7 but a CO concentration sensor may be used. The damper position adjusting device 30 can be modified in structure in various ways. The motor 34 may also include a gear motor (not illustrated) other than a stepping motor. Still further, the damper position adjusting device 30 is controlled by using the single controller (controller for boiler) 8. In addition to the controller 8, another controller (not illustrated) for the damper position adjusting device 30 may be installed and connected to the sensor 7 and the controller 8, thereby controlling an air ratio.

INDUSTRIAL APPLICABILITY

According to the present invention, in a water-tube boiler such as a small through-flow boiler, a hot-water supply system, and a combustion apparatus such as a regenerator for an absorption refrigerator, the emission amount of nitrogen oxides and carbon monoxide can be decreased to a value infinitely close to zero or to a permissible range by a simple method. Further, the stable effect of decreasing hazardous substances can be obtained by detecting the concentration of oxygen.

The invention claimed is:

1. A combustion method, comprising:
   a concentration ratio adjusting step of adjusting a concentration ratio K of nitrogen oxides, carbon monoxide, and oxygen in a gas free of hydrocarbons but containing nitrogen oxides, carbon monoxide, and oxygen from a gas generation source to a predetermined reference concentration ratio K0; and
   a hazardous-substance decreasing step of decreasing nitrogen oxides, using an oxidation catalyst having characteristics of coming into contact with the gas to oxidize carbon monoxides by oxygen and reduce nitrogen oxides by carbon monoxide, and decreasing concentrations of nitrogen oxides and carbon monoxide on a secondary side to substantially zero when the concentration ratio K on a primary side is set to the predetermined reference concentration ratio K0,
   wherein the concentration ratio adjusting step detects a concentration of oxygen on the secondary side of the oxidation catalyst to control the concentration ratio K to the predetermined reference concentration ratio K0 so that a detected oxygen concentration becomes a set oxygen concentration substantially close to zero, the predetermined reference concentration ratio K0 satisfying the following formulas (1) and (2):

$$([NOx]+2[O_2])/[CO]=K \qquad (1)$$

$$1.0 \leq K=K0 \leq 2.0 \qquad (2)$$

in the formula (1), [CO], [NOx], and [$O_2$] represent the concentrations of carbon monoxide, nitrogen oxides and oxygen, respectively, and [$O_2$] is larger than 0.

2. The combustion method according to claim 1, wherein the concentration ratio adjusting step detects concentrations of oxygen and carbon monoxide on the secondary side of the oxidation catalyst to control the concentration ratio K to the predetermined reference concentration ratio K0 so that a detected oxygen concentration becomes a set oxygen concentration substantially close to zero, the predetermined reference concentration ratio K0 satisfying the following formulas (1) and (2):

$$([NOx]+2[O_2])/[CO]=K \qquad (1)$$

$$1.0 \leq K=K0 \leq 2.0 \qquad (2)$$

in the formula (1), [CO], [NOx], and [$O_2$] represent the concentrations of carbon monoxide, nitrogen oxides and oxygen, respectively, and [$O_2$] is larger than 0.

3. A combustion apparatus, comprising:
a concentration ratio adjusting device of adjusting a concentration ratio K of nitrogen oxides, carbon monoxide, and oxygen in a gas free of hydrocarbons but containing nitrogen oxides, carbon monoxide, and oxygen from a gas generation source to a predetermined reference concentration ratio K0; and
an oxidation catalyst having characteristics of coming into contact with the gas to oxidize carbon monoxide by oxygen and reduce nitrogen oxides by carbon monoxide, and decreasing concentrations of nitrogen oxides and carbon monoxide on a secondary side to substantially zero when the concentration ratio K on a primary side is set to the predetermined reference concentration ratio K0,
wherein the combustion apparatus includes a sensor for detecting a concentration of oxygen on the secondary side of the oxidation catalyst, and
the concentration ratio adjusting device controls the concentration ratio K to the predetermined reference concentration ratio K0 so that a detected oxygen concentration by the sensor is decreased to a set oxygen concentration substantially close to zero, the predetermined reference concentration ratio K0 satisfying the following formulas (1) and (2):

$$([NOx]+2[O_2])/[CO]=K \qquad (1)$$

$$1.0 \leq K=K0 \leq 2.0 \qquad (2)$$

in the formula (1), [CO], [NOx], and [$O_2$] represent the concentrations of carbon monoxide, nitrogen oxides and oxygen, respectively, and [$O_2$] is larger than 0.

4. The combustion apparatus according to claim 3, wherein the sensor includes a sensor for detecting concentrations of oxygen and carbon monoxide on the secondary side of the oxidation catalyst, and
the concentration ratio adjusting device controls the concentration ratio K to the predetermined reference concentration ratio K0 so that the detected oxygen concentration by the sensor is decreased to a set oxygen concentration substantially close to zero, the predetermined reference concentration ratio K0 satisfying the following formulas (1) and (2):

$$([NOx]+2[O_2])/[CO]=K \qquad (1)$$

$$1.0 \leq K=K0 \leq 2.0 \qquad (2)$$

in the formula (1), [CO], [NOx], and [$O_2$] represent the concentrations of carbon monoxide, nitrogen oxides and oxygen, respectively, and [$O_2$] is larger than 0.

* * * * *